United States Patent [19]

Matyas et al.

[11] Patent Number: 5,265,164
[45] Date of Patent: * Nov. 23, 1993

[54] CRYPTOGRAPHIC FACILITY ENVIRONMENT BACKUP/RESTORE AND REPLICATION IN A PUBLIC KEY CRYPTOSYSTEM

[75] Inventors: Stephen M. Matyas; Donald B. Johnson; An V. Le, all of Manassas; Rostislaw Prymak, Dumfries, all of Va.; William C. Martin, Concord; William S. Rohland, Charlotte, both of N.C.; John D. Wilkins, Somerville, Va.

[73] Assignee: International Business Machines Corporation, Armonk, N.Y.

[ * ] Notice: The portion of the term of this patent subsequent to Aug. 25, 2009 has been disclaimed.

[21] Appl. No.: 786,237

[22] Filed: Oct. 31, 1991

[51] Int. Cl.$^5$ .............................................. H04K 1/00
[52] U.S. Cl. ...................................... 380/30; 380/23; 380/25; 380/45; 380/21
[58] Field of Search .................... 380/30, 23, 25, 45, 380/21

[56] References Cited

U.S. PATENT DOCUMENTS 4,200,770 4/1980 Hellman et al. .
4,218,582 8/1980 Hellman et al. .
4,405,829 9/1983 Rivest et al. .
4,850,017 7/1989 Matyas, Jr. et al. .
4,908,861 3/1990 Brachtl et al. .
4,918,728 4/1990 Matyas et al. .
4,924,514 5/1990 Matyas et al. .
4,924,515 5/1990 Matyas et al. .
4,941,176 7/1990 Matyas et al. .

OTHER PUBLICATIONS

R. W. Jones, "Some Techniques for Handling Encipherment Keys," ICL Technical Journal, Nov. 1982, pp. 175-188.
D. W. Davies & W. L. Price, "Security for Computer Networks," John Wiley & Sons, N.Y., 1984, Sec. 6.5, Key Management With Tagged Keys, pp. 168-172.
W. Diffie, et al., "Privacy and Authenication: An Introduction to Cryptography," Proc. of IEEE, vol. 67, No. 3, Mar. 1979; pp. 397-427.

Primary Examiner—David C. Cain
Attorney, Agent, or Firm—John E. Hoel

[57] ABSTRACT

A computer apparatus, program and method function in a data processing system to replicate a cryptographic facility. The system includes a first cryptographic facility containing a portable part which personalizes the first cryptographic facility. The system also includes a second cryptographic facility which is linked to the first cryptographic facility by a public key cryptographic system. The portable part of the first cryptographic facility is encrypted and transferred to the second cryptographic facility, where it is decrypted and used to personalize the second cryptographic facility to enable replication of the first cryptographic facility. In one application, personalization of the second cryptographic facility can be in response to the detection of a failure in the first cryptographic facility. In another application, multiple cryptographic facilities can be brought on-line for parallel operation in the data processing system.

26 Claims, 17 Drawing Sheets

FIG. 13
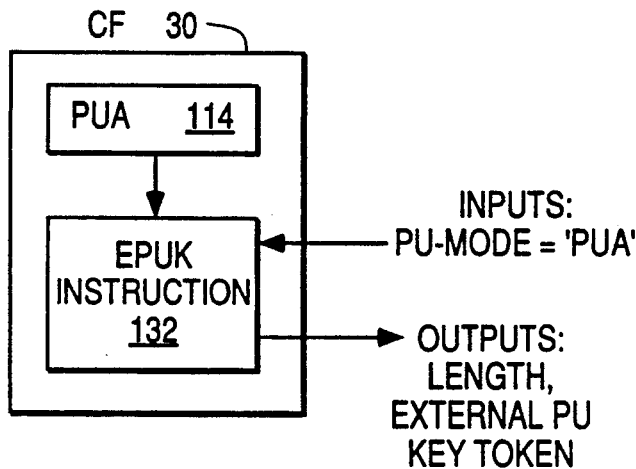
FIG. 14
EXTERNAL PUBLIC KEY TOKEN:
| HEADER, CONTROL VECTOR, PU KEY RECORD |
FIG. 15
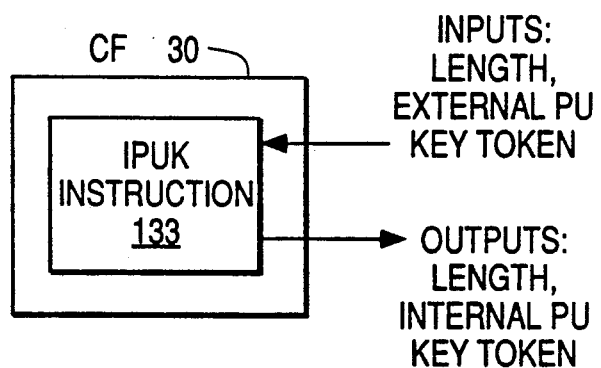
FIG. 16
INTERNAL PUBLIC KEY TOKEN:
| HEADER, CONTROL VECTOR, ENCRYPTED PU KEY RECORD, ENCRYPTED AUTHENTICATOR |

FIRST EMBODIMENT OF PORTABLE PART IMPORTING MEANS 304'

CRYPTOGRAPHIC FACILITY ENVIRONMENT BACKUP/RESTORE AND REPLICATION IN A PUBLIC KEY CRYPTOSYSTEM

BACKGROUND OF THE INVENTION

1. Technical Field

The invention disclosed broadly relates to data processing systems and methods and more particularly relates to cryptographic systems and methods for use in data processing systems to enhance security.

2. Background Art

The following patents and patent applications are related to this invention and are incorporated herein by reference:

B. Brachtl, et al., "Controlled Use of Cryptographic Keys Via Generating Stations Established Control Values," U.S. Pat. No. 4,850,017, issued Jul. 18, 1989, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Key Management Using Control Vector Translation," U.S. Pat. No. 4,993,069, issued Feb. 12, 1991, assigned to IBM Corporation and incorporated herein by reference.

S. M. Matyas, et al., "Secure Key Management Using Programmable Control Vector Checking,"0 U.S. Pat. No. 5,007,089, issued Apr. 9, 1991, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "Smart Card Having External Programming Capability and Method of Making Same," Ser. No. 004,501, filed Jan. 19, 1987, assigned to IBM Corporation and incorporated herein by reference.

S. M. Matyas, "Technique for Reducing RSA Crypto Variable Storage", U.S. Pat. No. 4,736,423, issued Apr. 5, 1988, assigned to IBM Corporation and incorporated herein by reference.

S. M. Matyas, et al., "Secure Management of Keys Using Control Vectors with Multi-Path Checking," Ser. No. 07/596,637, filed Oct. 12, 1990, assigned to IBM Corporation and incorporated here by reference.

S. M. Matyas, et al., "Secure Cryptographic Operations Using Alternate Modes of Control Vector Enforcement," Ser. No. 07/574,012, filed Aug. 22, 1990, assigned to IBM Corporation and incorporated here by reference.

S. M. Matyas, et al., "Method and Apparatus for Controlling the Use of a Public Key, Based on the Level of Import Integrity for the Key," Ser. No. 07/602,989, filed Oct. 24, 1990, assigned to IBM Corporation and incorporated herein by reference.

S. M. Matyas, et al., "A Hybrid Public Key Algorithm/Data Encryption Algorithm Key Distribution Method Based on Control Vectors," Ser. No. 07/748,407, filed Aug. 22, 1991, assigned to IBM Corporation and incorporated herein by reference.

S. M. Matyas et al., "Generating Public and Private Key Pairs Using a Passphrase," Ser. No. 07/766,533, filed Sep. 27, 1991, assigned to IBM Corporation and incorporated herein by reference.

S. M. Matyas et al., "Public Key Cryptosystem Key Management Based on Control Vectors," Ser. No. 07/766,260, filed Sep. 27, 1991, assigned to IBM Corporation and incorporated herein by reference.

The cryptographic architecture described in the cited patents by S. M. Matyas, et al. is based on associating with a cryptographic key, a control vector which provides the authorization for the uses of the key intended by the originator of the key. The cryptographic architecture described in the cited patents by S. M. Matyas, et al. is based on the Data Encryption Algorithm (DEA), see American National Standard X3.92-1981, Data Encryption Algorithm, American National Standards Institute, New York (Dec. 31, 1981), whereas the present invention is based on both a secret key algorithm, such as the DEA, and a public key algorithm. Various key management functions, data cryptography functions, and other data processing functions are possible using control vectors, in accordance with the invention. A system administrator can exercise flexibility in the implementation of his security policy by selecting appropriate control vectors in accordance with the invention. A cryptographic facility (CF) in the cryptographic architecture is described in the above cited patents by S. M. Matyas, et al. The CF is an instruction processor for a set of cryptographic instructions, implementing encryption methods and key generation methods. A memory in the cryptographic facility stores a set of internal cryptographic variables. Each cryptographic instruction is described in terms of a sequence of processing steps required to transform a set of input parameters to a set of output parameters. A cryptographic facility application program (CFAP) is also described in the referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," Proceedings of the IEEE, Volume 67, No. 3, March 1979, pp. 397-427. Public key systems are based on dispensing with the secret key distribution channel, as long as the channel has a sufficient level of integrity. In a public key cryptographic system, two keys are used, one for enciphering and one for deciphering. Public key algorithm systems are designed so that it is easy to generate a random pair of inverse keys PU for enciphering and PR for deciphering and it is easy to operate with PU and PR, but is computationally infeasible to compute PR from PU. Each user generates a pair of inverse transforms, PU and PR. He keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually referred to as a public key and PR is usually referred to as a private key.

One important feature of a public key cryptographic system is that it provides an improved method of key distribution, particularly in the case of a hybrid cryptographic system where it is desired to distributed DEA keys using the public key cryptographic system. To implement this key distribution feature, each user A, B, etc., has an associated public and private key pair (PUa,PRa), (PUb,PRb), etc. Any user, say B, who wishes to distribute a DEA key K to user A, merely encrypts K with PUa, the public key of A. Since only A has PRa, the private key of A, only A can decrypt and recover K. This ensures that only A (who has PRa) and the sender (who used PUa) have a copy of K. However, to make this protocol secure it is necessary for the sender to prove his or her identity to A. That is, if B is the sender, then B must prove his or her identity to A. Only then will A be sure that the key originated with B. (Note that B is already sure that only A can recover the key.) The means to accomplish this is for B to "sign" K or the encrypted key ePUa(K) or the message, with his or her private key PRb. Messages are signed using a cryptographic variable called a digital signature, as explained below. A method for distributing DEA keys using a public key algorithm is taught in co-pending patent application Ser. No. 07/748,407 ("A Hybrid Public Key/Data Encryption Algorithm Key Distribution Method Based on Control Vectors"), cited in the Background Art.

A corollary feature of public key cryptographic systems is the provision of a digital signature which uniquely identifies the sender of a message. If user A wishes to send a signed message M to user B, he operates on it with his private key PR to produce the signed message S. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from the sender A. Digital signatures can be produced either by decrypting the data to be signed with the private key, which works well when the data is short, or by first hashing the data with a strong one-way cryptographic function and decrypting the so-produced hashed value with the private key. Either method will work. Thus, in the above described method of DEA key distribution, B sends A two quantities: (1) the encrypted key, ePU(K), and (2) a digital signature e.g., of the form (a) dPR(ePU(K)) or dPR(hash(ePU(K))). A method for producing digital signatures based on the hash of the data to be signed is taught in co-pending patent application Ser. No. 07/748,407 ("A Hybrid Public Key Algorithm/Data Encryption Algorithm Key Distribution Method Based on Control Vectors"), cited in the Background Art. Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

In the above example of DEA key distribution, where B sends A a DEA key K, the method is secure only if A can be sure that K has in fact originated from the party so stated (i.e., K originated from the party who has signed K or ePUa(K) or the message). Suppose that B signs K or hash(K), not ePUa(K) or hash(ePUa(K)), i.e., the signature is of the form dPRb(K) or dPRb(hash(K)). Suppose that the signature is of the form dPRb(hash(K)), so that inverting dPRb(hash(K)) with PUb to recover hash(K) does not reveal the value of K. Now, if an adversary with public and private key pair (PUx,PRx) could substitute PUx for PUa, thus causing B to encrypt K with PUx instead of PUa, then the adversary could defeat security by (1) intercepting ePUx(K) and dPRb(hash(K)), (2) decrypting ePUx(K) with PRx, (3) re-encrypting K with PUa to produce ePUa(K), and (4) sending ePUa(K) and dPRb(hash(K)) to A. In this case, A and B are unaware that the adversary has had a peek at K. If B instead signs ePUa(K) or the hash of ePUa(K), then the attack still works, but is a bit more complicated. However, if an adversary with public and private key pair (PUx,PRx) could substitute PUx for PUa and PUx for PUb, thus causing B to encrypt K with PUx instead of PUa and could cause A to validate the signature dPRx(ePUa(K)) with PUx instead of PUb, then the adversary could defeat security by (1) intercepting ePUx(K) and dPRb(hash(ePUx(K)), (2) decrypting ePUx(K) with PRx, (3) re-encrypting K with PUa to produce ePUa(K), (4) hashing ePUa(K) to form hash(ePUa(K)), (5) decrypting hash(ePUa(K)) with PRx to form digital signature dPRx(hash(ePUa(K))), and (6) sending ePUa(K) and dPRx(hash(ePUa(K))) to A. In this case, A validates dPRx(hash(ePUa(K))) with PUx and thus believes that ePUa(K) originates with B. A and B are unaware that the adversary has had a peek at K.

The methods of attack outlined above are thwarted by ensuring that A has a valid copy of PUb and that B has a valid copy of PUa. The common method for accomplishing this is to use a certification center which permits public keys to be registered with the certification center. The process works like this. A party, say A, produces a key pair (PUa,PRa). PUa is included in a message, often called a certificate. The certificate contains a public key and key-related data such as an identifier of the party creating and registering the key, in this case, party A, a key name, a start and end date and time when the key is active, etc. The certification center also has a key pair (PUcert,PRcert), where PUcert is distributed with integrity, in advance, to each of the other parties in the network serviced by the certification center, i.e., to A, B, C, etc. After the certification center is satisfied that a request for public key registration is "okay" (e.g., that party A is in fact the actual party to whom the to-be-registered public key belongs), then the certification center signs the certificate with its private key PRcert, i.e., the cryptographic quantity dPRcert(hash(certificate)) is produced, and the certificate and digital signature are returned to party A or stored in a central directory. Thereafter, the certificate and digital signature can be used as proof that PUa belongs to party A. For example, party B obtains the certificate and digital signature from party A or from the central directory and validates the signature with PUcert, the public key of the certification center. This proves to B that PUa belongs to A. In like manner, A can obtain and authenticate a digital signature and certificate containing B's public key PUb. This completely thwarts the above attacks wherein an adversary substitutes one public key for another, thereby causing A to use PUx instead of PUb and causing B to use PUx instead of PUa.

In most cryptographic systems, the keys belonging to a cryptographic device are encrypted with a single master key and stored in a cryptographic key data set. The master key is stored in clear form within the cryptographic hardware. The concept of using a single master key to encrypt keys stored in a cryptographic key data set is known as the master key concept. In order to electronically distribute keys from one device to another, e.g., to distribute a data-encrypting key as part of session initiation, each pair of devices shares a unique key-encrypting key under which all distributed keys are encrypted. Thus, a data-encrypting key encrypts many messages. A key-encrypting key encrypts many electronically distributed data-encrypting keys, and so forth. A master key encrypts many key-encrypting and data-encrypting keys stored in a particular system's cryptographic key data set. Key management design principles are discussed in a paper by S. M. Matyas et al. entitled "A key-management scheme based on control vectors," IBM Systems Journal, Volume 30, No. 2, 1991, pp. 175-191.

Most cryptographic systems make use of many different types of keys, so that information encrypted with a key of one type is not affected by using a key of another type. A key is assigned a type on the basis of the information the key encrypts or the use being made of the key. For example, a data-encrypting key encrypts data. A key-encrypting key encrypts keys. A PIN-encrypting key encrypts personal identification numbers (PINs) used in electronic funds transfer and point-of-sale applications. A MAC key is used to generate and authenticate message authentication codes (MACs).

At the time a key is generated, the user or user application determines, from among the range of options permitted by the key management, the form of each generated key. For example, a generated key can be produced (1) in clear form, (2) in encrypted form suitable for storage in a cryptographic key data set, or (3) in encrypted form suitable for distribution to a designated receiving device. Generally, cryptographic systems have different options for generating keys in these different forms. For example, the Generate Key Set (GKS) instruction described in U.S. Pat. No. 4,941,176 (cited in the Background Art) accepts a mode parameter which defines the output forms of a randomly-generated DEA key K. In the present invention, the key types are expanded to include a device key pair used for backup and recovery purposes. Also, at the time a key is generated, the user or user application determines, from among the range of options permitted by the key management, the type and usage of each generated key. Type and usage information are examples of a class of key-related information called control information. For example, in U.S. Pat. Nos. 4,850,017, 4,941,176, 4,918,728, 4,924,514, 4,924,515, and 5,007,089, and IBM dockets MA9-88-033 and BT9-90-018 the control information is embodied within a data variable called the control vector. The control vector concepts taught in these US Patents and IBM dockets is summarized in a paper by S. M. Matyas entitled "Key handling with control vectors," IBM Systems Journal, Volume 30, No. 2, 1991, pp. 151-174. In the case of the device key pair, the control information associated with the PU and PR keys is also stored with the keys within the CF, where its integrity is ensured.

In order for a DEA-based cryptographic system to be made operable, each device must first be initialized with a master key and at least one key-encrypting key. The master key permits keys stored in the cryptographic key data set to be encrypted, and the key-encrypting key establishes a key-distribution channel with at least one other network device. When key distribution is performed in a peer-to-peer environment, each device is initialized with a key-encrypting key for each other device with which it wishes to communicate. However, when key distribution is performed with the assistance of a key-distribution center (KDC) or key-translation center (KTC), each device is initialized with only one key-encrypting key shared with the KDC or KTC. Thereafter, additional key-encrypting keys are distributed electronically and initialized automatically using the KDC or KTC. The key-distribution channel can also be made unidirectional. That is, one key-encrypting key encrypts keys transmitted from a first device to a second device and another key-encrypting key encrypts keys transmitted in the other direction. As stated above, each cryptographic device is initialized with at least one key-encrypting key. Consider the process of installing keys between two devices A and B, where one device, say A, generates a key-encrypting key for installation at both A and B. At device A, a clear key-encrypting key KK is randomly generated, e.g., by coin tossing. The clear KK is then manually loaded into the cryptographic hardware where it is encrypted under the A's master key, or a variant key formed as the Exclusive-OR product of the master key and a control vector. The encrypted value of KK is then stored in A's cryptographic key data set. The clear value of KK is then transported to device B, e.g., using a courier. At device B, KK is manually loaded into the cryptographic hardware where it is encrypted under B's master key, or a variant key formed as the Exclusive-OR product of the master key and a control vector. The encrypted value of KK is then stored in B's cryptographic key data set. The encrypted copies of KK at A and B enable A and B to communicate cryptographically as described in U.S. Pat. No. 4,941,176. U.S. Pat. No. 4,941,176 also provides for the initial key-encrypting key KK to be defined as the Exclusive-OR product of two or more key parts. At device A, each key part is manually loaded into the cryptographic hardware. The separately entered key parts are combined within the hardware to form the final value of KK. Each key part can be transported to the receiving cryptographic device using a separate courier. At device B, each key part is manually loaded into the cryptographic hardware and combined to form the final value of KK.

In a hybrid cryptographic system, the key management is designed so that DEA keys are distributed under the encryption of a public key. That is, B distributes a key to A by encrypting the key under PUa, A's public key. A recovers the key by decrypting the received encrypted key with PRa, A's private key, as described above. Thus, the key-encrypting key or keys manually installed into the cryptographic devices of a DEA-based cryptographic system can now be electronically distributed using a public key algorithm.

Instead of manually installing a public and private key pair (PU,PR) at each device, (PU,PR) is generated inside the cryptographic device. The private key, PR, is stored within the cryptographic hardware or it is encrypted under a master key and stored in a cryptographic key data set. If the public key is to be used for key distribution purposes, then its integrity within the cryptographic network can be assured by registering it at a certification center and receiving a certificate and digital signature, as described above. This allows the cryptographic device to freely distribute the public key to other devices with the assurance that the other devices will accept the public key as genuine. Thus, the keys used with the public key algorithm are handled automatically using electronic means; there is no requirement for manual installation of these keys at the cryptographic devices within the network.

In some cases, the public and private keys belonging to a cryptographic device may be stored in clear form within the cryptographic hardware. As an alternative to this approach, keys may be stored outside the cryptographic hardware, e.g., encrypting the public and private keys with the master key, or a variant key derived from the master key, and storing them in key tokens together with other key-related data (i.e., a control vector), as described in co-pending patent application Ser. No. 07/766,260 ("Public Key Cryptosystem Key Management Based on Control Vectors"). Thus, the prior art describes how, in a hybrid cryptographic system using a public key algorithm, to eliminate (1) couriers and (2) manual entry of clear key-encrypting keys. While this is an improvement over a DEA-based cryptographic system, the prior art does not teach how to eliminate a requirement for manual entry of clear keys altogether. Except in special situations, each cryptographic device will need several, and perhaps many, key pairs to perform the tasks of key management and data management. The most practical means for doing this is to make use of a system master key under which, at least, the private keys of the public key algorithm are encrypted for storage in a cryptographic key data set. It is also argued in co-pending patent application Ser. No. 07/766,260 ("Public Key Cryptosystem Key Management Based on Control Vectors") that it is sometimes advantageous to encrypt the public keys for storage in a cryptographic key data set, even though this is not done to keep the public keys secret. Thus, it would be advantageous for the cryptographic system key management to be designed so that the need for manual entry of keys, including the master key itself, is completely eliminated. This would permit cryptographic systems to be used in places where it is impractical or infeasible for a secret master key to be manually loaded into the cryptographic device. In so doing, cryptographic systems could now be designed so that their initialization is fully automated, i.e., not requiring couriers and not requiring the manual entry of keys by humans.

Also note that if all manual entry of keys could be eliminated, this would allow a potential higher level of security to be established for the system, as no human, authorized or not, would be able to introduce known key values into the system which, if entered, would allow the possibility of off-line decryption of anything encrypted under the known quantity.

However, once a mechanism exists for the automatic generation of a system master key, this implies that the master key is not known to anyone or any device except the cryptographic device in which it is generated. This raises the potential that a cryptographic device may accidentally lose its master key due to a system malfunction (hardware malfunction, lighting strike, etc.) causing the master key to be accidentally erased or unusable. In such an event, the keys under which the master key are encrypted are, for practical purposes, lost. That is, the keys are lost in the sense that there is no way that the cryptographic system can now decrypt them, which is required before the keys may be used or processed within the secure boundary of the cryptographic hardware. Therefore, an automatically generated master key also requires a means for backup and recovery. In many cryptographic systems, such as described in U.S. Pat. Nos. 4,850,017, 4,941,176, 4,918,728, 4,924,514, 4,924,515, and 5,007,089, and co-pending patent applications Ser. No. 07/766,260 ("Public Key Cryptosystem Key Management Based on Control Vectors"), etc., the cryptographic hardware is initialized with configuration data as well as other cryptographic variables, including keys, such as the master key. The configuration data personalizes a device, e.g., uniquely identifies a device and restricts the processing options that the device is permitted to perform, including the possibility of crippling the ability to manually enter keys. Thus, in order for cryptographic devices to be easily recoverable in the event that a master key is lost, a means must be provided that permits the keys and configuration data stored in the cryptographic hardware to be ported from one cryptographic device for recovery in another cryptographic device.

OBJECTS OF THE INVENTION

It is therefore an object of the invention to provide an improved method of key management in a public key cryptographic system.

It is another object of the invention to provide a cryptographically secure method for the cryptographic environment of one cryptographic device to be backed up and recovered within another cryptographic device.

It is another object of the invention to permit the keys and cryptographic variables initialized within the cryptographic hardware of one device to be securely ported and reinitialized within the cryptographic hardware of another device.

It is another object of the invention to provide a cryptographically secure method for the cryptographic environment of one cryptographic device to be replicated within another cryptographic device or devices for the purpose of increased processing capability and/or reliability.

It is another object of the invention to permit the keys and cryptographic variables initialized within the cryptographic hardware of one device to be securely ported and replicated within the cryptographic hardware of another device or devices for the purpose of increased processing capability and/or reliability.

It is another object of the invention to provide a key management scheme in which no cryptographic keys need to be manually loaded within the cryptographic device.

It is another object of the invention to provide a key management scheme in which the system master key, used for encrypting keys stored outside the secure hardware, is generated within cryptographic hardware so that its value is not known outside the cryptographic hardware.

It is another object of the invention to provide a means for backup and recovery in situations where the master key is known only to the cryptographic hardware.

It is another object of the invention to provide a key management scheme in which the public and private key pairs generated at a cryptographic device are encrypted under a master key known only to the cryptographic hardware so that the private keys are also known only to the cryptographic hardware.

It is another object of the invention to provide a key management scheme in which the cryptographic devices within a cryptographic network can implement an authentication scheme based on digital signatures using private keys known only to the cryptographic hardware such that the digital signatures are generated only on cryptographic quantities produced within the cryptographic hardware as the result of executing a cryptographic instruction, and not on data supplied by the application program or the cryptographic software.

SUMMARY OF THE INVENTION

These and other objects, features, and advantages are accomplished by the invention disclosed herein.

Environment Description: FIG. 1 illustrates a network block diagram showing a communications network 10 to which is connected a plurality of data processors including data processor 20, data processor 20', and data processor 20". Also included in each data processor is a cryptographic system, as shown in FIG. 1. Data processor 20 includes cryptographic system 22, data processor 20' includes cryptographic system 22' and data processor 20" includes cryptographic system 22". Each data processor supports the processing of one or more applications which require access to cryptographic services, such as for the encryption, decryption and authentication of application data and the generation and installation of cryptographic keys. The cryptographic services are provided by a secure cryptographic facility in each cryptographic system. The network provides the means for the data processors to send and receive encrypted data and keys. Various protocols, that is, formats and procedural rules, govern the exchange of cryptographic quantities between communicating data processors in order to ensure the interoperability between them.

FIG. 2 illustrates the cryptographic system 22. In the cryptographic system 22, the cryptographic facility (CF) 30 has an input 37 from a physical interface. The cryptographic facility access program (CFAP) 34 is coupled to the cryptographic facility 30 by means of the interface 31. The cryptographic key data set (CKDS) 32 is connected to the cryptographic facility access program 34 by means of the interface 33. The application programs (APPL) 36 are connected to the cryptographic facility access program 34 by means of the interface 35.

A typical request for cryptographic service is initiated by APPL 36 via a function call to the CFAP 34 at the interface 35. The service request includes key and data parameters, as well as key identifiers which the CFAP 34 uses to access encrypted keys from the CKDS 32 at the interface 33. The CFAP 34 processes the service request by issuing one or more cryptographic access instructions to the CF 30 at the interface 31. The CF 30 may also have an optional physical interface 37 for direct entry of cryptographic variables into the CF 30. Each cryptographic access instruction invoked at the interface 31 has a set of input parameters processed by the CF 30 to produce a set of output parameters returned by the CF 30 to the CFAP 34. In turn, the CFAP 34 may return output parameters to the APPL 36. The CFAP 34 may also use the output parameters and input parameters to subsequently invoke instructions. If the output parameters contain encrypted keys, then the CFAP 34, in many cases, may store these encrypted keys in the CKDS 32.

FIG. 3 illustrates the cryptographic facility 30. The cryptographic facility 30 is maintained within a secure boundary 140. The cryptographic facility 30 includes the instruction processor 142 which is coupled to the cryptographic algorithms 144 which are embodied as executable code. The cryptographic facility environment memory 146 is coupled to the instruction processor 142. The physical interface can be coupled over line 37 to the CF environment memory 146, as shown in the figure. The instruction processor 142 is coupled to the cryptographic facility access program (CFAP) 34 by means of the interface at 31.

The instruction processor 142 is a functional element which executes cryptographic microinstructions invoked by the CFAP access instruction at the interface 31. For each access instruction, the interface 31 first defines an instruction mnemonic or operation code used to select particular microinstructions for execution. Secondly a set of input parameters is passed from the CFAP 34 to the CF 30. Thirdly, a set of output parameters is returned by the CF 30 to the CFAP 34. The instruction processor 142 executes the selected instruction by performing an instruction specific sequence of cryptographic processing steps embodied as microinstructions stored in cryptographic microinstruction memory 144. The control flow and subsequent output of the cryptographic processing steps depend on the values of the input parameters and the contents of the CF environment memory 146. The CF environment memory 146 consists of a set of cryptographic variables, for example keys, flags, counters, CF configuration data, etc., which are collectively stored within the CF 30. The CF environment variables in memory 146 are initialized via the interface 31, that is by execution of certain CF microinstructions which read input parameters and load them into the CF environment memory 146. Alternately, initialization can be done via an optional physical interface which permits cryptographic variables to be loaded directly into the CF environment memory 146, for example via an attached key entry device. The physical embodiment of the cryptographic facility secure boundary 140, incorporates the following physical security features. The physical embodiment resists probing by an insider adversary who has limited access to the cryptographic facility 30. The term "limited" is measured in minutes or hours as opposed to days or weeks. The adversary is constrained to a probing attack at the customer's site using limited electronic devices as opposed to a laboratory attack launched at a site under the control of the adversary using sophisticated electronic and mechanical equipment.

The physical embodiment also detects attempts at physical probing or intruding, through the use of a variety of electro-mechanical sensing devices. Also, the physical embodiment of the cryptographic facility 30 provides for the zeroization of all internally stored secret cryptographic variables. Such zeroization is done automatically whenever an attempted probing or intrusion has been detected. The physical embodiment also provides a manual facility for a zeroization of internally stored secret cryptographic variables. Reference to the Abraham, et al. patent application cited above, will give an example of how such physical security features can be implemented.

Backup and Recovery Procedure: FIG. 4 is a block diagram illustration of the backup and recovery process involving two cryptographic devices, A and B. Cryptographic device A is the backed up device and cryptographic device B is the recovery device. Referring to FIG. 4, cryptographic device A contains, at least, cryptographic facility 30 and a key storage (i.e., cryptographic key data set) 32. Cryptographic facility 30 provides a set of callable cryptographic instructions (not shown) to the cryptographic facility access program (CFAP). Cryptographic facility 30 contains a cryptographic facility (CF) environment 146. The CF environment 146 represents that part of the cryptographic facility that can be configured and initialized with keys, cryptographic variables, and configuration data. In this sense, the CF environment 146 is that part which is personalized by the installation or the owner of the cryptographic device. The CF environment 146 consists of non-portable part 103 and a portable part 104. The non-portable part 103 represents that part of the CF environment that does not port as part of the backup and recovery procedure. The portable part 104, on the other hand, represents that part of the CF environment that does port as part of the backup and recovery procedure. More is said about the portable and non-portable parts below. The randomly generated master key 105 is one example of information contained in the portable part 104. Note that the randomly generated master key may be generated by a true random number generator or by a pseudorandom number generator where the seed values have been generated with sufficient variability to thwart attempts at guessing the seed values. Discussion of true random and pseudorandom number generators is found in the literature and in U.S. Pat. No. 4,941,176 and co-pending patent application Ser. No. 07/766,533 ("Generating Public and Private Key Pairs Using a Passphrase").

Key storage 32 (also called the cryptographic key data set) contains PU key tokens and PR key tokens. The key token contains a header, a control vector, and encrypted key record, and an encrypted authenticator record, as explained in detail in co-pending patent application Ser. No. 07/766,260 ("Public Key Cryptosystem Key Management Based On Control Vectors") cited in the Background Art. The key record contains either a public key PU or a private key PR, where PU and PR are the public and private keys associated with an asymmetric or public key algorithm. The key records and authenticator records are encrypted with randomly generated master key 105 using a method described in detail in co-pending patent application Ser. No. 07/766,260 ("Public Key Cryptosystem Key Management Based On Control Vectors") cited in the Background Art. However, because the master key is randomly generated within the CF 30, and not manually installed into the CF 30 by a human, randomly generated master key 105 is not known to any person or device except to CF 30. Thus, if randomly generated master key 105 should be accidentally erased or corrupted due to a hardware malfunction, then the public and private keys stored in the PU and PR key tokens in key storage 32 would not be recoverable within CF 30. Hence, for practical purposes, the public and private keys at device A would be unusable or unrecoverable. As a defense against the loss of randomly generated master key 105, and hence against the loss of the public and private keys stored in key storage 32, a backup and recovery procedure is made available at all cryptographic devices. FIG. 4 illustrates that the backup and recovery process involves porting the portable part 104 of cryptographic device A at step 107 to cryptographic device B. In addition, the backup and recovery process involves porting the key tokens in key storage 32 of cryptographic device A at step 106 to cryptographic device B. The process of porting the key tokens does not involve cryptography, since the keys are in a form that they can be safely transmitted from device A to device B. Mechanisms for sending, receiving, and installing these key tokens, of course, must be implemented and made available as part of the backup and recovery procedure. However, this part of the procedure is straightforward and is therefore not discussed in any great detail. The part of the backup and recovery procedure that involves porting the portable part 104, is more complicated. The portable part 104 contains both secret and non-secret information. The secret information must be protected between device A and device B, i.e., during the time when the secret information is exposed outside the secure hardware (i.e., the CF) at devices A and B. An adversary who intercepts the portable part at 107 must not be able to discern or recover any of the secret information contained in the portable part. Hence, encryption must be used between devices A and B to protect this secret information. This is accomplished by using device B's public device key to encrypt the secret information. Note that it is essential that device A be assured that it is actually a public device key that is used to encrypt the secret data (and not some other type of public key, especially a bogus public key where an attacker knows the associated private key), that it is device B's device key and not some other device's, and that device B is authorized to contain device A's environment information. In addition, the integrity of the secret and non-secret information must be ensured. An adversary who intercepts the portable part at 107 must not be able to modify the information or replace the portable part at 107 with information chosen by the adversary. Otherwise, without a means for device B to authenticate the portable part from device A, device B may import a portable part that has been changed and which does not represent the portable part originally at device A. For example, if an adversary could change the value of a public key to one of his own choosing, then when the portable part is recovered at device B the adversary would now have planted a false key in device B.

Referring again to FIG. 4, given a device to be backed up, say device A, and a device to be the recovery device, say device B, the backup and recovery procedure permits the portable part 104 of cryptographic device A to be safely and securely ported to cryptographic device B and initialized within the portable part 104' of device B. That is, the portable part 104 of device A replaces the portable part 104' of device B. In addition, the keys in key storage 32 of device A replace the keys in key storage 32' of device B. At device A, the portable part is exported using an Export Cryptographic Facility Environment Record (ECFER) instruction and, at device B, the portable part is imported using an Import Cryptographic Facility Environment Record (ICFER) instruction. The ECFER and ICFER instructions are also described in co-pending patent application Ser. No. 07/766,260 ("Public Key Cryptosystem Key Management Based On Control Vectors") cited in the Background Art.

FIG. 5 is a block diagram illustration showing the use of the ECFER and ICFER instructions in the backup and recovery process. Referring now to FIG. 5, cryptographic facility 30 at device A contains a non-portable part 103, a portable part 104, and an ECFER instruction 108. Cryptographic facility 30' at device B contains a non-portable part 103', a portable part 104', and an ICFER instruction 109'. Actually, cryptographic facility 30 at device A contains an ICFER instruction 109 (not shown) and cryptographic facility 30' at device B contains an ECFER instruction 108' (not shown), which makes the implementations symmetric. At device A, the ECFER instruction produces (1) a Cryptographic Variable (CVAR) 110 and (2) an External Crypto Facility Environment Record (XCFER) 111, from the portable part 104 and other information stored within CF 30 (not shown) and other information supplied as input to the ECFER instruction from outside the CF 30 (not shown), explained in greater detail below. The CVAR 110 is an authenticator that permits device B to authenticate the XCFER. In an alternate embodiment, the CVAR is an encrypted crypto facility DEA backup key record containing a DEA key used to encrypt the secret part of portable part 104 and an authenticator that permits device B to authenticate the XCFER. Each of these embodiments are explained in greater detail below. The XCFER 111 contains an encrypted secret part prepared from the secret part of portable part 104 and a non-secret part prepared from the non-secret part of portable part 104.

Note that, as described, the backup process may be used to allow recovery of the information on device A by device B when device A suffers a unrecoverable hardware or software failure. It may also be used as a method for initializing device B with the same configuration data as device A, even though device A has not experienced a failure. This would allow increased performance by allowing multiple servers and may possibly simplify the initialization step and ensure the configurations are the same. This would also enhance reliability as redundancy of cryptographic facilities would eliminate a source of single point of failure. Even beyond the initialization step, the backup and recovery process may be used to replicate (i.e., clone) the identifying characteristics and configuration of one system to one or more other systems. This could be done to allow dynamic reconfiguration of the physical components of the system to provide for increased performance and/or reliability as these requirements are identified.

FIG. 6 is a block diagram illustration of Crypto Facility Environment Record (CFER) 11 and External Crypto Facility Environment Record (XCFER) 111. CFER 11 consists of a header 12 containing length and displacement information and indicating the record is a CFER, a secret part 13, and a non-secret part 14. Secret part 13 is just the secret part of portable part 104. Non-secret part 14 is just the non-secret part of portable part 104. XCFER 111 consists of a header 112, an encrypted secret part 113, and a non-secret part 14. For practical purposes, header 112 is the same as header 12 except that it indicates the record is an XCFER instead of a CFER. Encrypted secret part 113 is formed by encrypting the secret part 13 in the CFER. The non-secret part 13 is the same in both the CFER and the XCFER.

Returning now to the FIG. 5, the CVAR and XCFER are returned to the CFAP 34 (i.e., the cryptographic software) at 107 and transmitted to cryptographic device B. At cryptographic device B, the XCFER is imported using an ICFER instruction. The ICFER instruction recovers the CFER, and hence the portable part 104, from the received XCFER supplied as an input and other information stored within CF 30' (not shown) and other information supplied as input to the ICFER instruction from outside the CF 30' (not shown), explained in greater detail below. The ICFER instruction also authenticates the XCFER, or equivalently the recovered CFER (containing portable part 104), using information stored within the CF 30' (not shown) and other information supplied as input to the ICFER instruction from outside the CF 30' (not shown), explained in greater detail below. If the step of authentication succeeds, the ICFER instruction continues; otherwise, if the step of authentication fails, the ICFER instruction is aborted and the recovered portable part 104 is not imported. The reader will appreciate that in some embodiments the step of authentication could be performed before the recovery of portable part 104 or could be performed after the recovery of portable part 104 (i.e., before or after the decryption step to decrypt and recover the clear secret part of portable part 104). The so-recovered portable part 104 is then used to replace the portable part 104' in cryptographic device B. The key tokens in the key storage at device A are also transmitted to device B and replace the key tokens in the key storage at device B, not shown in FIG. 5. Once portable part 104' has replaced portable part 104' and once the key tokens in key storage of device A have replaced the key tokens in key storage of device B, device B is for all intents and purposes now a replicated copy or clone of device A.

BRIEF DESCRIPTION OF THE DRAWINGS

These and other objects, features, and advantages of the invention will be more fully appreciated with reference to the accompanying figures.

FIG. 13 is a block diagram illustration of the EPUK instruction.

FIG. 14 illustrates the format of an external public key token.

FIG. 15 is a block diagram illustration of the IPUK instruction.

FIG. 16 illustrates the format of an internal PU key token.

DESCRIPTION OF THE BEST MODE FOR CARRYING OUT THE INVENTION

Figure 7:
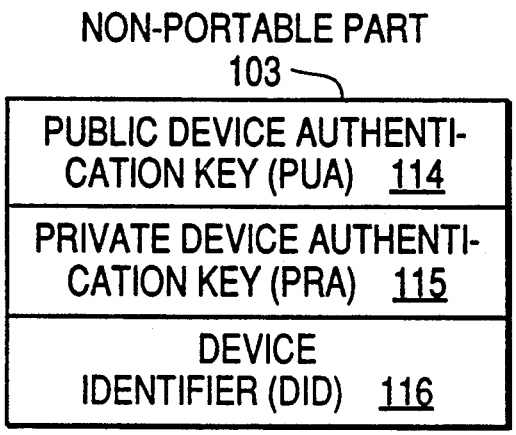
FIG. 7 is a block diagram illustration of the non-portable part 103 of a cryptographic facility environment.

Non-Portable Part: FIG. 7 is a block diagram illustration of the non-portable part 103 of the cryptographic facility environment of device A, actually of any device A, B, C, etc. Non-portable part 103 contains a public device authentication key (PUA) 114, a private device authentication key (PRA) 115, and a device identifier (DID) 116. DID 116 is a value, of say 128 bits, that uniquely identifies the device within the network. The DID may even be chosen so that it uniquely identifies the device within multiple networks, according to some agreement among the parties who adhere to an agreed-to naming convention. The PUA key 114 and PRA key 115 are a public and private key pair associated with an asymmetric or public key algorithm, such as the RSA public key algorithm. The PUA and PRA keys play a special role in the backup and recovery process, as explained below. The unique feature of the PUA and PRA keys is that they are generated within the cryptographic hardware (i.e., the CF) in such a way that no person and no other cryptographic device ever knows the clear value of the private key PRA. The cryptographic hardware (i.e., the CF) has no means to permit the PRA key to be exported. On the other hand, the PUA key can be exported and shared with other cryptographic devices, as explained below. Note that even though the PUA key is termed a device authentication key and as such is used to verify the signatures produced by a device, it will also be used for encryption (for secrecy), either directly or indirectly, of the secret portion of the cryptographic facility environment record.

Figure 8:
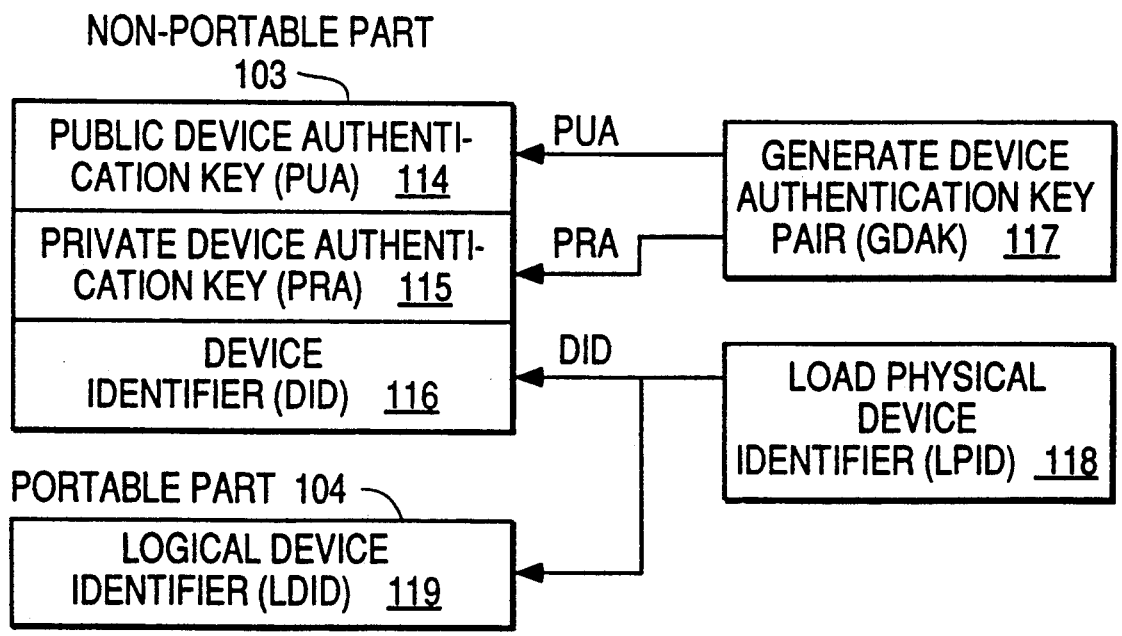
FIG. 8 is a block diagram illustration showing the initialization of the non-portable part 103 of a cryptographic facility environment.

Initialization via the GDAK and LPID Instructions: FIG. 8 is a block diagram illustration showing the initialization of the non-portable part 103 of a cryptographic facility environment. Referring to FIG. 8, a Generate Device Authentication Key Pair (GDAK) instruction 117, which is one of the cryptographic instructions available within the CF 30, is used to initialize the PUA and PRA keys within non-portable part 103. When GDAK instruction 117 is invoked, it causes a (PUA,PRA) key pair to be generated within the CF 30. Note that the GDAK invocation requires use of a true random number generator or a pseudo-random number generator which has been seeded with sufficient variability to supply the arbitrary length random number from which the public and private key pair will be generated. See co-pending patent application Ser. No. 07/766,533 ("Generating Public and Private Key Pairs Using a Passphrase"), cited in the background art. The generated PUA key is stored as Public Device Authentication Key (PUA) 114 in non-portable part 103 of the CF 30. The generated PRA key is stored as Private Device Authentication Key (PRA) 115 in non-portable part 103 of the CF 30. The intention is that means do not exist permitting the PRA key stored at 115 to be exported or returned as a clear value to the cryptographic software (i.e., the CFAP). On the other hand, the intention is that means do exist (not shown here) permitting the PUA key stored at 114 to be exported or returned as a clear.

Referring again to FIG. 8, a Load Physical Device Identifier (LPID) instruction 118, which is one of the cryptographic instructions available within the CF 30, is used to initialize the device identifier within non-portable part 103. When LPID instruction 118 is invoked, it causes a device identifier specified as an input to the GDAK instruction, referred to as the DID value, to be stored as Device Identifier (DID) 116 in non-portable part 103 of the CF 30. The LPID instruction 118 also causes the same DID value to be stored as Logical Device Identifier (LDID) 119 in portable part 104 of the CF 30. The distinction between the Device Identifier (DID) and the Logical Device Identifier (LDID) is the following: when a device is backed up, the LDID value ports within the XCFER, whereas the DID value does not. The physical identifier of a device remains constant, whereas the logical device identifier may change. It is important that devices have both a physical and a logical identifier. The physical identifier identifies the physical device, which at times is an important aspect of ensuring the integrity of the cryptographic protocols used within a cryptographic network, including the backup and recovery protocol described here. For example, the DID identifies a device to its users. Thus, users can be certain that they are interacting with the correct device. The DID value can be read from a device using a device audit function, such as an Export Crypto Facility Audit Record (ECFAR) instruction described in co-pending patent application Ser. No. 07/766,260 ("Public Key Cryptosystem Key Management Based on Control Vectors"), cited in the background art. On the other hand, the logical identifier identifies the logical device, which is also an important aspect of ensuring the integrity of the cryptographic protocols. For example, in situations where a public key algorithm is used to distribute DEA keys as part of a hybrid key distribution protocol, such as the hybrid key distribution protocol described in co-pending patent application Ser. No. 07/602,989 ("Method and Apparatus for Controlling the Use of a Public Key, Based on the Level of Import Integrity for the Key"), cited in the background art, the LDID value 119 is called an Environment Identifier (EID) and is used as an anti-reimport value. This is accomplished in the Generate Key Set PKA (GKSP) instruction by storing the value of EID of the generating device within the key block to be encrypted and transmitted to a receiving device. The Import DEA Key (IDK) instruction checks to ensure that the EID value in the recovered (decrypted) key block is not equal to the EID value (i.e., the LDID 119) in the CF 30. Consider another example wherein a public key algorithm is used to distribute DEA keys as part of a hybrid key distribution protocol and the protocol requires that the public keys to be first registered at a certification center so that certificates and signatures on those certificates prepared with the private key of the certification center can be produced and issued within the network. In such a case, the certificate will ordinarily contain the identifier of the owner or creator of the public key, which may be a device identifier. That is, the public key may be associated with a cryptographic device, in which case it is, or may be, necessary that the key be registered using a logical device identifier (not a physical device identifier). In that way, the certificates containing the logical device identifier will not be invalidated in the event that a device is backed up and recovered at another device. This is so, because the logical device identifier in the portable part 104 is ported in the XCFER to the recovery device. Likewise, the CF 30 is now able to confirm that a certificate containing an LDID value does or does not belong to this device by simply comparing the LDID value in the certificate with the LDID value stored in Logical Device Identifier 119 of the CF 30. The LPID instruction is explained in detail in co-pending patent application Ser. No. 07/766,260 ("Public Key Cryptosystem Key Management Based on Control Vectors"), cited in the Background Art. Those skilled in the art will recognize that the descriptions of the GDAK and LPID instructions pertain to the initialization of any cryptographic hardware, whether it be device A, device B, etc.

Figure 9:
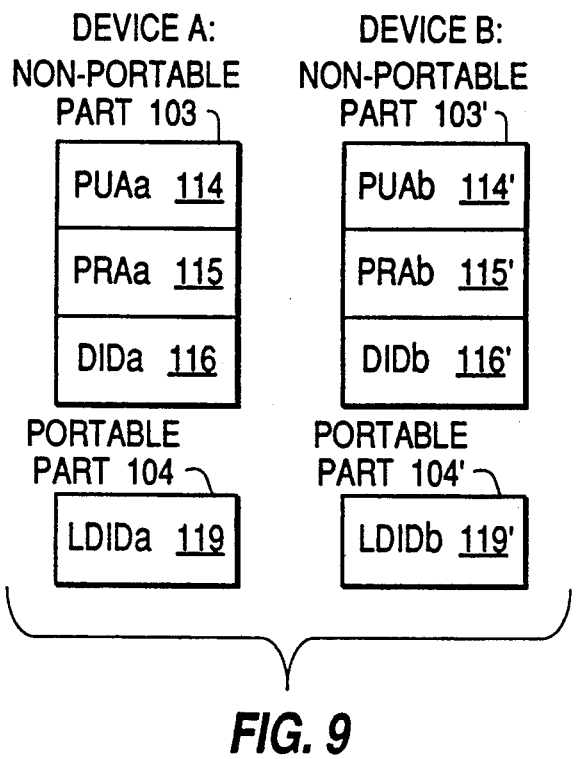
FIG. 9 is a block diagram illustration of portions of the cryptographic facility environments 146 and 146' at cryptographic devices A and B, respectively.

FIG. 9 is a block diagram illustration of portions of the cryptographic facility environments 146 and 146' at cryptographic devices A and B, respectively. Referring to FIG. 9, at device A the GDAK instruction 117 and the LPID instruction 118 are, or have been used to initialize values PUAa, PRAa, DIDa, and LDIDa at 114, 115, 116, and 119, respectively. At device B the GDAK instruction 117' and the LPID instruction 118' are, or have been used to initialize values PUAb, PRAb, DIDb, and LDIDb at 114', 115', 116', and 119', respectively. From this configuration, the reader will see that for a given DID value, the value of PUA and PRA may change over time via subsequent executions of the GDAK and LPID instructions. However, there is no way for installation personnel or users to cause the cryptographic hardware (i.e., the CF) to generate and assign the same values of PUA and PRA to different values of DID, except as may occur by mere chance. However, for keys that are derived from more than 128 independently generated bits, which is ordinarily the case for keys used with an asymmetric key algorithm, the accidental chance of reproducing a key pair is so remote that, for practical purposes, it is of no concern whatsoever. The GDAK and LPID instructions are also implemented in such a way that neither instruction can be executed without executing the other, see co-pending patent application Ser. No. 07/766,260 ("Public Key Cryptosystem Key Management Based on Control Vectors"), cited in the background art. Thus, for practical purposes, each different value of DID initialized within the cryptographic hardware (i.e., the CF) will have a different generated key pair (PUA,PRA). Consequently, in a network of cryptographic devices, each device with a unique assigned device identifier, DID value, also has a unique associated (PUA,PRA) key pair that can be used to "prove" its identity (i.e., the identify of the hardware device) to any other hardware device. Now, if device A is backed up and recovered at device B, the non-portable part 103' remains unchanged, i.e., value PUAb, PRAb, and DIDb are not altered. Only the portable part 104' at device B is changed. In that case, the value of LDIDb at 119' is replaced with the value of LDIDa at 119. Of course, there are many other values in the portable part 104 of device A that replace the portable part 104' of device B.

Figure 1:
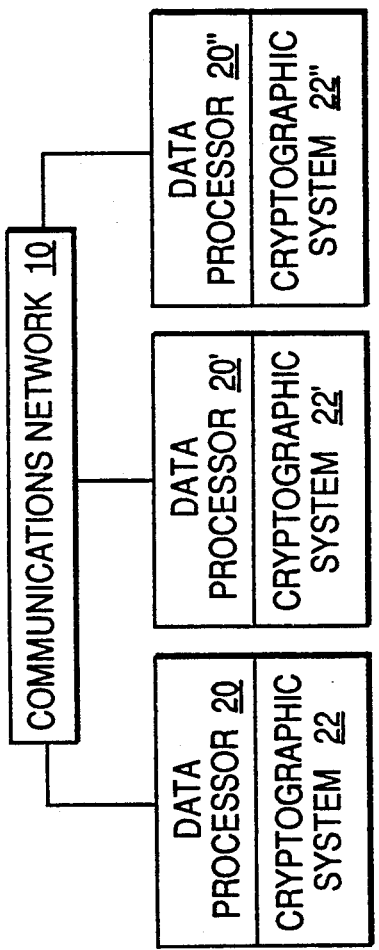
FIG. 1 illustrates a communications network 10 including a plurality of data processors, each of which includes a cryptographic system.
Figure 2:
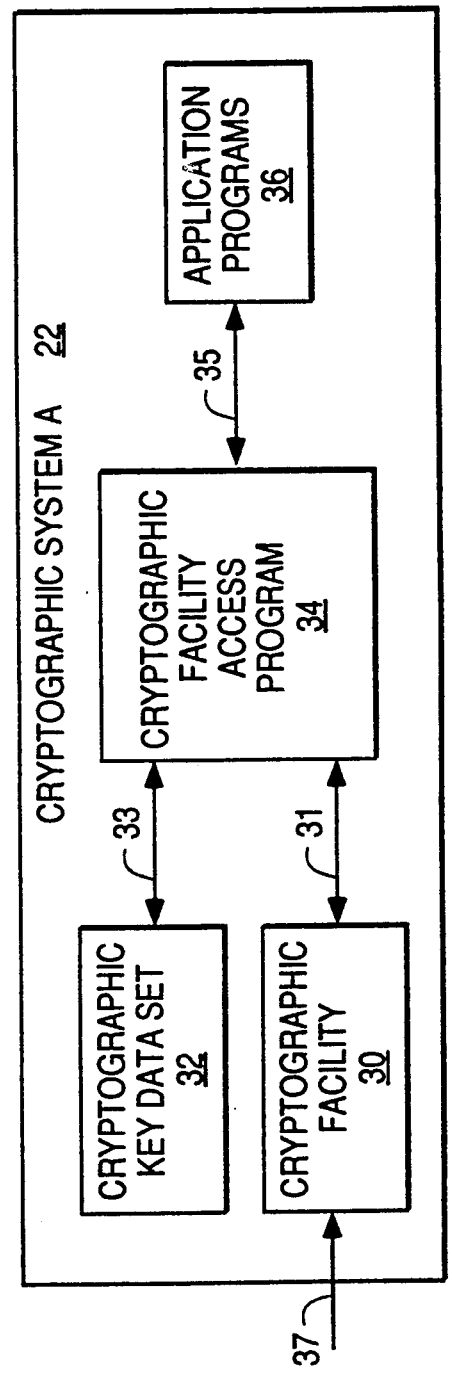
FIG. 2 is a block diagram of a cryptographic system 22.
Figure 3:
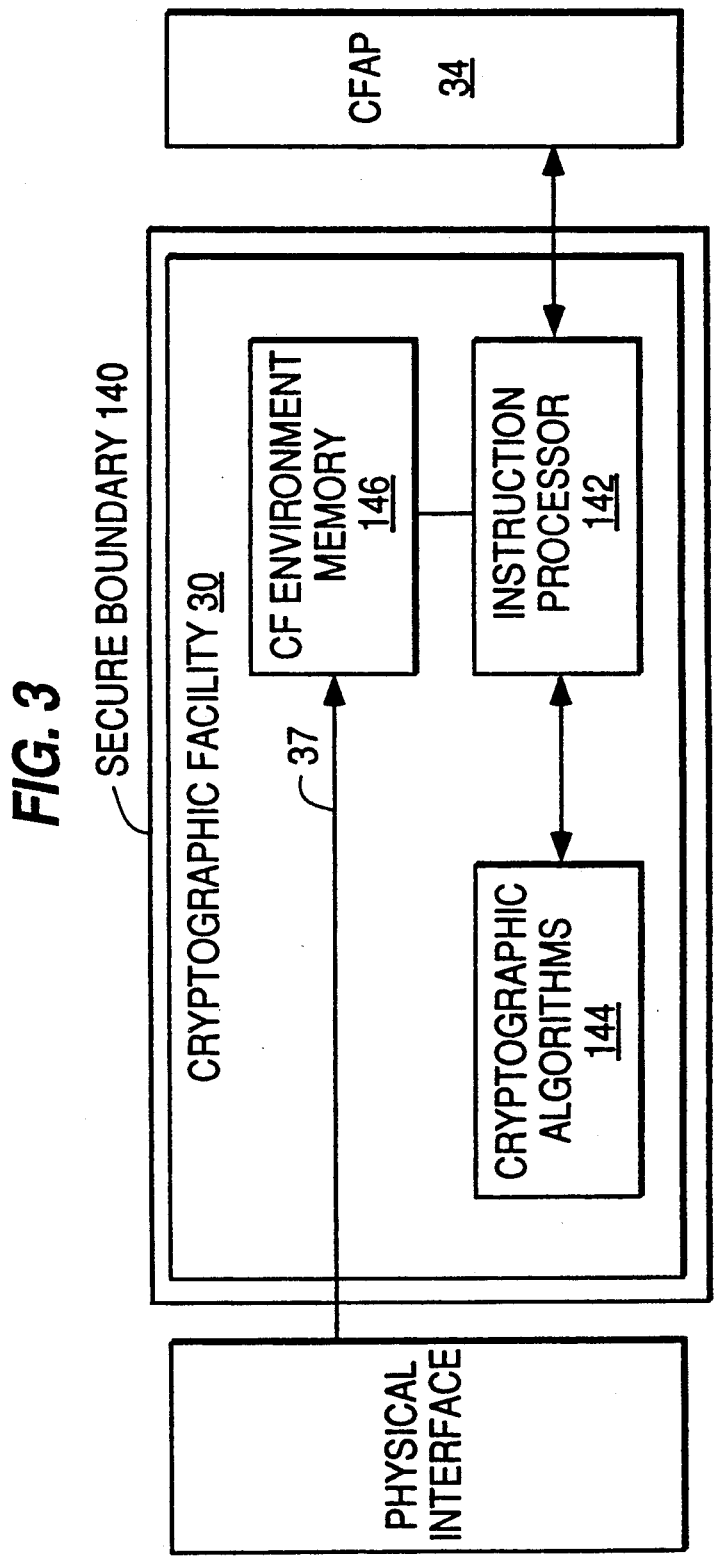
FIG. 3 is a block diagram of a cryptographic facility 30.
Figure 4:
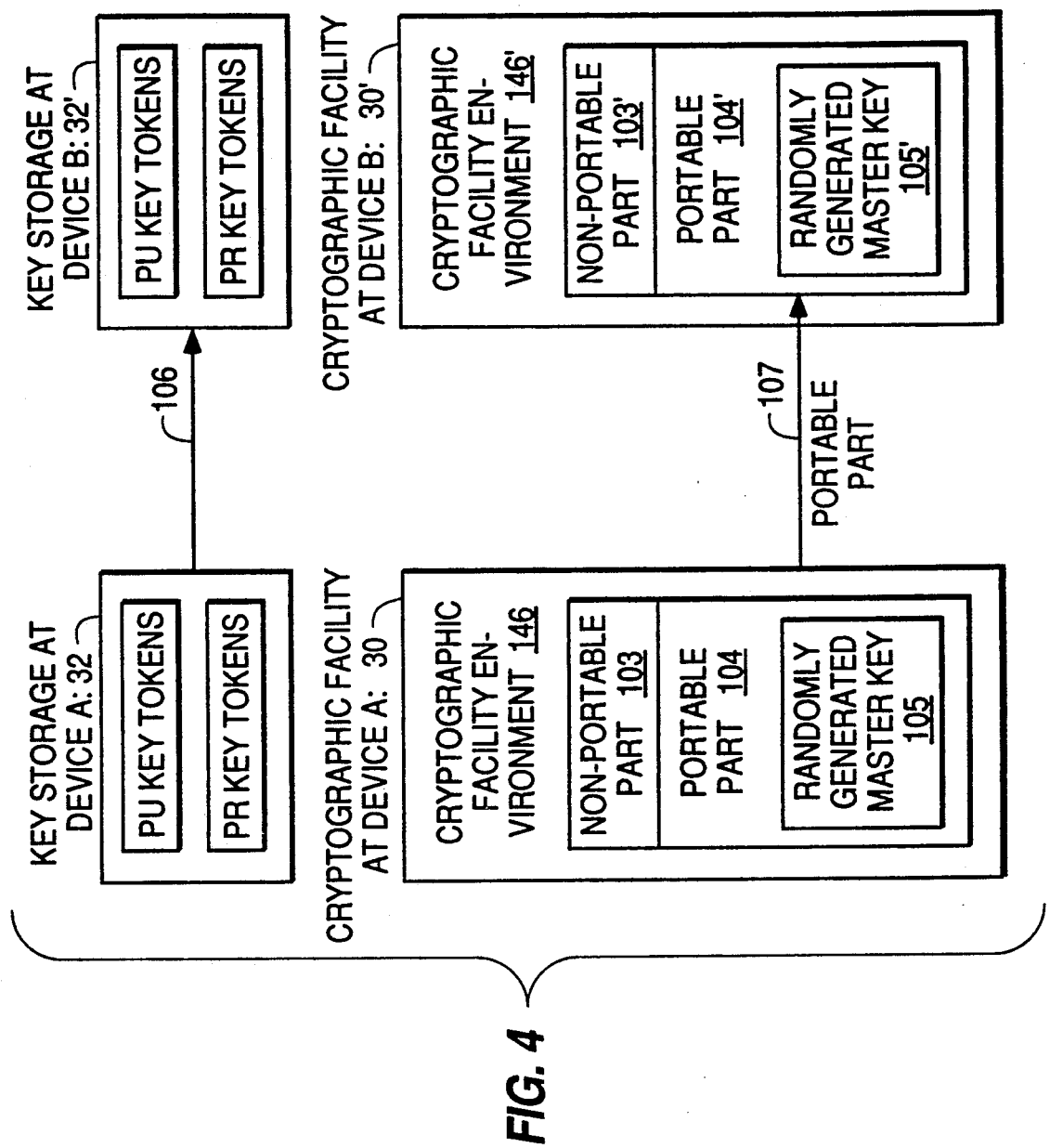
FIG. 4 is a block diagram illustration of the backup and recovery process involving two cryptographic devices, A and B.
Figure 5:
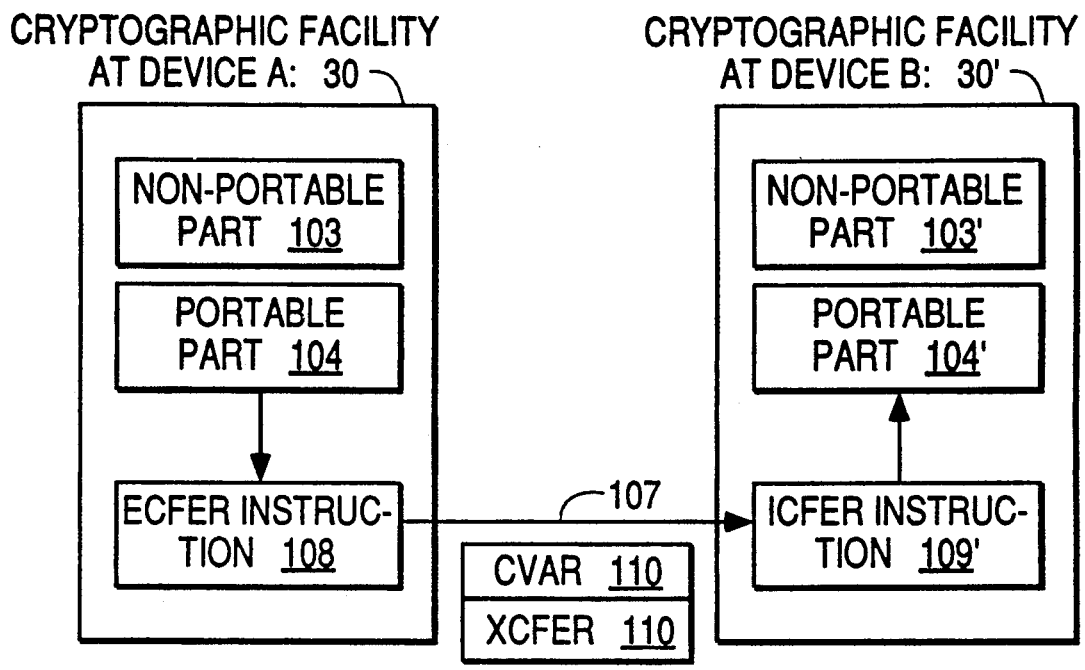
FIG. 5 is a block diagram illustration showing the use of the ECFER and ICFER instructions in the backup and recovery process.
Figure 6:
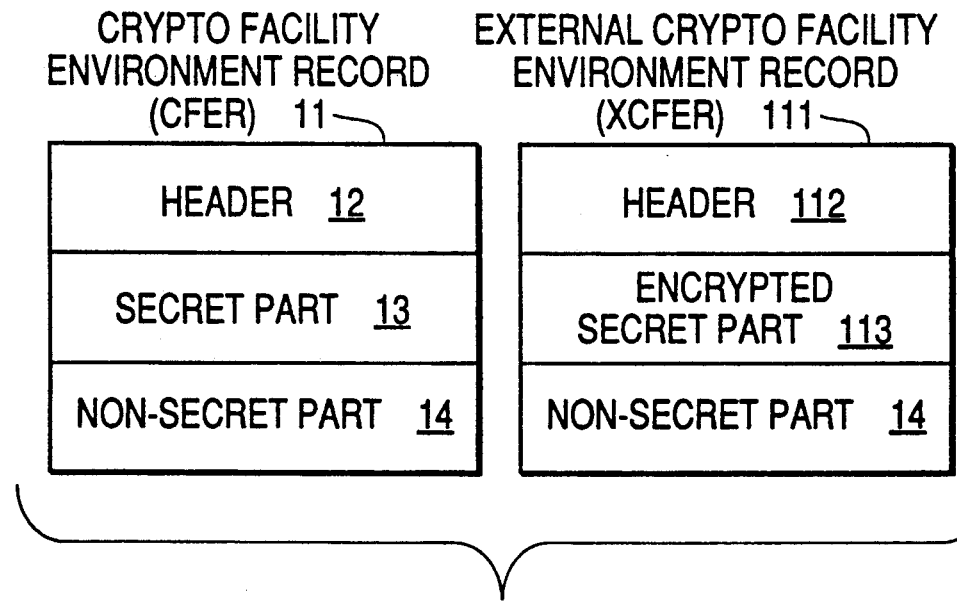
FIG. 6 is a block diagram illustration of Crypto Facility Environment Record (CFER) 11 and External Crypto Facility Environment Record (XCFER) 111.
Figure 10:
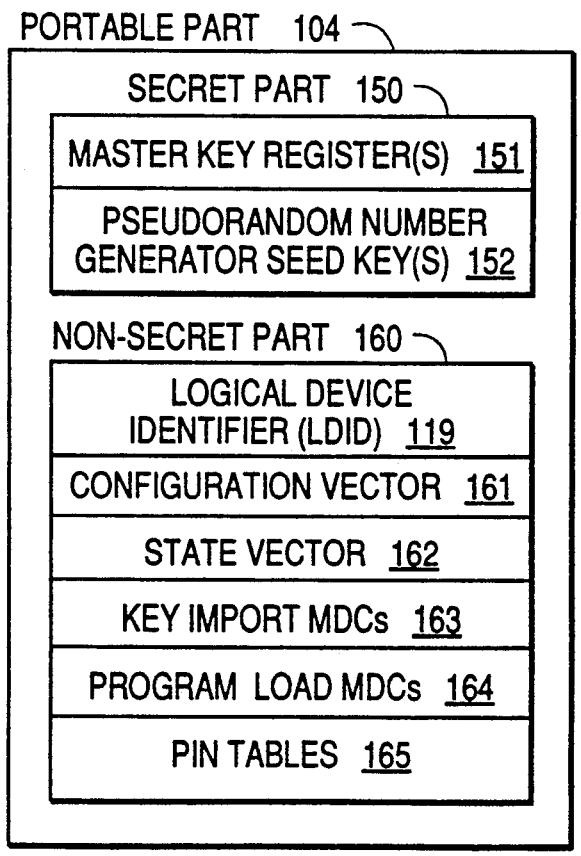
FIG. 10 is a block diagram illustration of the various information fields in portable part 104.

Portable Part: FIG. 10 is a block diagram illustration of the information fields in portable part 104. Those skilled in the art will recognize that portable part 104 can contain many other secret and non-secret fields without detracting from the spirit of the intended invention. Thus, those skilled in the art will appreciate that the described invention is not limited by, or in its use, to only those fields described in FIG. 10. Referring now to FIG. 10, portable part 104 contains a secret part 150 and a non-secret part 160. Secret part 150 contains master key registers 151 and pseudorandom number generator seed keys 152. Master key registers 151 may include new, current, and old master keys, as well as separate master keys for encrypting DEA keys and PKA keys. Pseudorandom number generator seed keys 152 consist of one or more seed keys used to initialize the pseudorandom number generator. Non-secret part 160 contains a logical device identifier (LDID) 119, also sometimes referred to as an Environment Identifier (EID), a configuration vector 161, a state vector 162, key import MDCs 163, program load MDCs 164, and PIN tables 165. Logical device identifier 119 has a ready been explained (see the descriptions of FIG. 8 and FIG. 9). Configuration vector 161 contains a set of encoded fields that define and limit the use of the CF. In many respects, the configuration vector is similar to a control vector, except that a control vector defines and limits the use of a cryptographic key whereas the configuration vector defines and limits the use of the entire cryptographic facility. For example, the configuration vector can "turn on" or "turn off" cryptographic instructions, so that a cryptographic instruction will execute only if it is "turned on." Another use of the configuration vector, as it relates to the use of the ECFER and ICFER instructions, is to limit the protocol modes permitted by the ECFER and ICFER instruction. As explained below, the ECFER and ICFER instructions have three different protocol modes, with differing degrees of cryptographic security (low to high). Through the configuration vector, an installation can set the protocol mode or modes permitted for backup and recovery, and thereby establish the minimum level of security under which backup and recovery may be performed. The configuration vector is described in greater detail in co-pending patent application Ser. No. 07/766,260 ("Public Key Cryptosystem Key Management Based on Control Vectors"), cited in the background art. State vector 162 contains a set of encoded fields that describe the present state of the cryptographic facility. For example, the state vector contains flags indicating whether the master key or keys have been initialized or not. The state vector 162 may also contain history information such as cryptographic instructions that have been executed, and possibly a count of the number of executions, that may be used for auditing purposes. The state vector may also contain a flag to indicate whether the cryptographic facility is or is not a clone of another device. For example, the clone flag is set by the ICFER instruction at the time it executes to import an XCFER. Key import MDCs 163 consist of one or more MDCs (or cryptographic hash values) used as a means to import external key tokens (or external key units) received from other devices, such a external key tokens containing public keys. The Import Public Key (IPUK) instruction described in co-pending patent applications Ser. No. 07/602,989 ("Method and Apparatus for Controlling the Use of a Public Key, Based on the Level of Import Integrity for the Key"), and Ser. No. 07/766,260 ("Public Key Cryptosystem Key Management Based on Control Vectors"), cited in the background art, provides a means for importing public keys stored in external key units with an option to import only if an MDC value calculated on the external key unit matches an MDC value pre-stored in the cryptographic facility (i.e., in key import MDCs 163). Program load MDCs 164 consist of one or more MDCs (or cryptographic hash values) used as a means to securely load executable programs into the cryptographic facility. A program is loaded only if an MDC value calculated on the program matches an MDC value pre-stored in the cryptographic facility (i.e., in program load MDCs 164). PIN tables 165 consists of one or more PIN tables that contain configuration data specifying how the cryptographic instructions performing PIN manipulations are to be executed. The term PIN (for Personal Identification Number) is used in banking applications to refer to a 4 to 6 decimal digit value used to authenticate a banking customer to an automated teller machine. Instruction processor 142 in FIG. 3 contains a set of cryptographic instructions for performing a variety of cryptographic services, including data services, PIN services, key management and key handling services, etc. Co-pending patent application Ser. No. 07/766,260 ("Public Key Cryptosystem Key Management Based on Control Vectors"), cited in the background art, lists and describes a set of cryptographic instructions for implementing public key cryptography.

Figure 11:
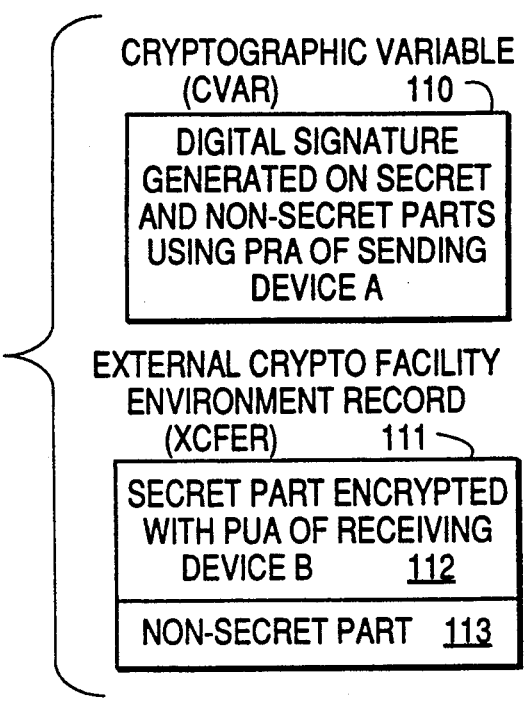
FIG. 11 is a block diagram illustration of a first embodiment of the subject invention in which cryptographic variable (CVAR) 110 is a digital signature generated on the secret and non-secret parts using the private device authentication key PRA of the sending or exporting device.

First Embodiment: FIG. 11 is a block diagram illustration of a first embodiment of the subject invention in which cryptographic variable (CVAR) 110 is a digital signature generated on the secret and non-secret parts using the private device authentication key PRA of the sending or exporting device. The secret part of portable part 104 contained in the XCFER 111 is encrypted with the public device authentication key PUA of the receiving or importing device. Thus, if device A is being backed up for recovery at device B, then the digital signature is calculated using PRAa, the private key of device A and the secret part is encrypted with PUAb, the public key of device B. If the length of the secret part is greater than can be accommodated using one encryption of PUAb, it is necessary to divide the secret part into n blocks, where each block is capable of being encrypted with public key PUAb. The method of calculating the digital signature with private key PRAa is not important to the present invention, and any method described in the prior art will suffice. A method for calculating digital signatures is described in co-pending patent application Ser. No. 07/748,407 ("A Hybrid Public Key Algorithm/Data Encryption Algorithm Key Distribution Method Based on Control Vectors"), cited in the Background Art. In summary, the method consists of first calculating a hash value on the data to be signed, in this case the concatenation of the secret and non-secret parts (the order is unimportant). The hash algorithm must be a cryptographic one-way function that ensures it is not computationally feasible to find two data inputs that hash to the same output hash value. One such function that satisfies this cryptographic requirement is the MDC-2 algorithm described in U.S. Pat. No. 4,908,861 requiring 2 DEA encryption steps for each 64-bit block of input contained in the data to be signed. The MDC-2 algorithm is also described in a paper by S. M. Matyas entitled "Key Handling with Control Vectors," IBM Systems Journal, Volume 30, No. 2, 1991, pp. 151-174. The so-produced hash value is then formatted in a suitable signature block and decrypted with the private key used for signing (in this case PRAa) to produce the digital signature (referred to as DSIG). In the simplest case, the signature block consists of the hash value and padding data, as may be needed as part of the decryption process. Note that the term decryption is used when performing operations with the private key and the term encryption is used when performing operations with the public key. Actually, in some public key algorithms there is no difference between encryption and decryption except as may be distinguished by which key is being used. In those cases, it may be just as appropriate to say encryption with the private key or decryption with the public key, and those skilled in the art will recognize that these differences in naming and convention of usage do not detract from the spirit of the invention, and that these variations are covered by the present invention.

At the receiving device, the recovery operation proceeds as follows. The encrypted secret part is decrypted using PRAb, the private key of device B. Then the clear secret part and the non-secret part are authenticated using the digital signature. Different processes for signature verification do exist and can be used. These differences may depend on adherence to some digital signature standard, e.g., International Standards Organization draft international standard (ISO DIS) 9796, or may depend on the particular public key algorithm being used. The precise method of signature verification is again unimportant to the present invention, and those skilled in the art will recognize that the present invention does not intend to be limited to a particular method for generating or verifying digital signatures. However, one method is to encrypt the digital signature with PUAa, the public key of device A, to recover the signature block. Then, a hash value is calculated on the concatenation of the recovered secret part and the received non-secret part and the calculated hash value is compared for equality with the hash value in the recovered signature block. If the comparison is favorable (i.e., equal hash values), then the XCFER is valid; otherwise, if the comparison is not favorable (i.e., not equal hash values), then the XCFER is not valid. In an alternate embodiment, the digital signature is calculated on the XCFER itself, that is, on the concatenation of the encrypted secret part and the clear non-secret part. In either case, if the signature verification step succeeds, then the recovered secret part and the received non-secret part, which comprise the portable part 104 of device A replaces the portable part 104' of device B.

Figure 12:
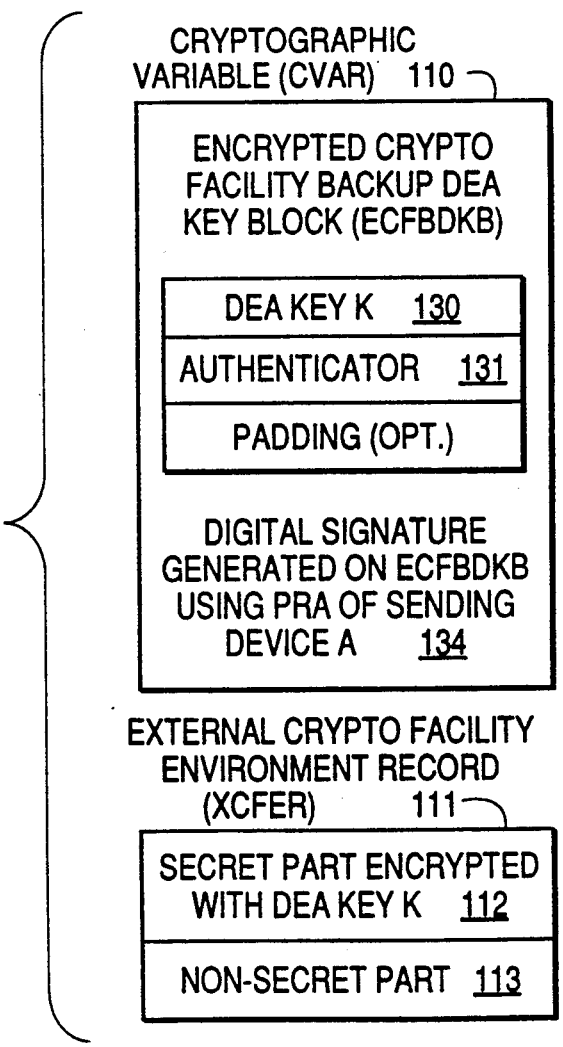
FIG. 12 is a block diagram illustration of a second embodiment of the subject invention in which cryptographic variable (CVAR) 110 is an encrypted crypto facility backup DEA key block (ECFBDKB).

Second Embodiment: FIG. 12 is a block diagram illustration of a second embodiment of the subject invention in which cryptographic variable (CVAR) 110 consists of (a) an encrypted crypto facility backup DEA key block (ECFBDKB) 134 as described in greater detail in co-pending patent application Ser. No. 07/766,260 ("Public Key Cryptosystem Key Management Based on Control Vectors"), cited in the background art, and (b) a digital signature generated on the encrypted crypto facility backup DEA key block using the private device authentication key PRA of the sending or exporting device 135. Basically, the ECFBDKB is produced by padding a clear crypto facility backup DEA key record (CFbDKR) as necessary to form a crypto facility backup DEA key block (CFBDKB), then encrypting the CFBDKB with PUAb, the public key of Device B. The CFBDKR is a record consisting of a DEA key K 130, authenticator 131, and other control fields (not shown in FIG. 12). The secret part of portable part 104 is encrypted with DEA key K 130 to form encrypted secret part 112. The authenticator 131 is a cryptographic one-way function of the concatenation of the secret part and the non-secret part. For example, authenticator 131 can be a 128-bit modification detection code calculated using the MDC-2 algorithm mentioned above.

At the receiving device, the recovery operation proceeds as follows. The ECFBDKB is first authenticated using the supplied digital signature, i.e., digital signature calculated on ECFBDKB using PRA of sending device A. Different processes for signature verification do exist and can be used. These differences may depend on adherence to some digital signature standard, e.g., International Standards Organization draft international standard (ISO DIS) 9796, or may depend on the particular public key algorithm being used. The precise method of signature verification is unimportant to the present invention, and those skilled in the art will recognize that the present invention does not intend to be limited to a particular method for generating or verifying digital signatures. One method for handling digital signatures has already been described above under the section describing a first embodiment of the invention. Assuming that the digital signature verifies properly, the ECFBDKB is then decrypted using PRAb, the private key of device B, to recover the clear value of CFBDKB and the process continues. Otherwise the process is halted. The CFBDKR containing the DEA key K 130 and authenticator 131 is then extracted from the CFBDKB. Then the encrypted secret part is decrypted using the DEA key K 130 extracted from the CFBDKR. Then the clear secret part and the non-secret part are authenticated using the authenticator 131 extracted from the CFBDKR. Different processes for authentication are possible, and those skilled in the art will recognize that the present invention does not depend on using a particular method of authentication. However, when authenticator 131 is calculated with a cryptographic one-way hash value, then the authentication process consists of re-calculating a hash value on the concatenation of the recovered secret part and the received non-secret part and comparing the calculated hash value for equality with authenticator 131 in the CFBDKR. If the comparison is favorable (i.e., equal hash values), then the XCFER is valid; otherwise, if the comparison is not favorable (i.e., not equal hash values), then the XCFER is not valid. In an alternate embodiment, the authenticator is calculated on the XCFER itself, that is, on the concatenation of the encrypted secret part and the clear non-secret part. In either case, if the authentication step succeeds, then the recovered secret part and the received non-secret part which comprise the portable part 104 of device A replaces the portable part 104' of device B.

When the cryptographic system contains both a symmetric and an asymmetric cryptographic algorithm, the second embodiment is the preferred embodiment. The reason for this is that encrypting a secret part that may be very long can be performed very quickly with a symmetric algorithm like the DEA. This is also advantageous since it introduces no requirement for encryption of long blocks, i.e., blocks longer than the block size of the algorithm, with the public key algorithm. Thus, it may be possible to implement the public key algorithm in such a way that only single block encryption and decryption needs to be supported. This will simplify the implementation of the public key algorithm.

Distribution of PUA Keys: In order that the ECFER and ICFER instructions can be made operable, it is necessary for the exporting and importing (i.e., the sending and receiving) cryptographic devices to exchange their respective PUA keys. For example, if device A is to be backed up and recovered at device B, then PUAa must be given to device B and PUAb must be given to device A. This is accomplished by using the Export Public Key (EPUK) and Import Public Key (IPUK) instructions described in co-pending patent applications with Ser. No. 07/602,989 ("Method and Apparatus for Controlling the Use of a Public Key, Based on the Level of Import Integrity for the Key") and Ser. No. 07/766,260 ("Public Key Cryptosystem Key Management Based on Control Vectors"), cited in the Background Art. FIG. 13 is a block diagram illustration of the EPUK instruction. The EPUK instruction permits, among other things, a PUA key stored internally within the CF 30 to be exported in the form of an external public key token. FIG. 14 illustrates the format of an external public key token. An external public key token consists of a header, a control vector, and a PU key record.

The external PU key token is similar to a PU key token, as described in co-pending patent application Ser. No. 07/766,260 ("Public Key Cryptosystem Key Management Based on Control Vectors"), except that the external PU key token has no encrypted authenticator record and it contains a clear PU key record rather than an encrypted PU key record. Referring to FIG. 13, there is shown a CF 30 with an EPUK instruction 132, which executes in instruction processor 142, and a PUA key 114, which is contained in CF Environment 146. Instruction processor 142 and CF Environment 146 are not shown in FIG. 13. The EPUK instruction has an input parameter called PU-mode, which specifies to the EPUK instruction whether the public key to be exported is a PUA key contained within CF 30 (i.e., PU-mode='PUA') or a PU key contained in a PU key token (i.e., PU-mode='not_PUA'). When PU-mode='not_PUA' is specified, a PU key token is also supplied as an input to the EPUK instruction (not shown in FIG. 13). The EPUK instruction also has an option for producing a digital signature on the external PU key token using a private key contained in a PR key token supplied as an input to the EPUK instruction (not shown in FIG. 13). The EPUK instruction produces, as outputs, an external PU key token containing the exported public key and an optional length parameter indicating the length of the produced external PU key token. The inputs to the EPUK instruction of FIG. 13 are selected (i.e., PU-mode='PUA') so that the internal PUA key is exported. That is, the external PU key token produced by the EPUK instruction of FIG. 13 contains the PUA key of the device. Thus, in the example of devices A and B, device A executes an EPUK instruction to produce an external PU key token containing PUAa, the public device authentication key of device A, and device B executes an EPUK instruction to produce an external PU key token containing PUAb, the public device authentication key of device B. In the simplest case, device A sends the external PUAa key token to device B, where it is imported, and device B sends the external PUAb key token to device A, where it is imported. The method whereby devices A and B merely exchange their respective PUA keys is one method supported by the ECFER and ICFER instructions, and represents the lowest security mode permitted. Two other modes of PUA key exchange are supported by the ECFER and ICFER instructions. These additional modes are described below.

FIG. 15 is a block diagram illustration of the IPUK instruction. The IPUK instruction permits public keys stored in the form of external PU key tokens to be imported in the form of PU key tokens. For convenience, the PU key tokens described in co-pending patent application Ser. No. 07/766,260 ("Public Key Cryptosystem Key Management Based on Control Vectors") shall be, at times, referred to as internal PU key tokens. Thus, the process of importing a public key consists of transforming an external PU key token into an internal PU key token. More specifically, the external PU key token containing a header, control vector, and clear key record is transformed into an internal PU key token containing a header, a control vector, and encrypted PU key record, and an encrypted authenticator record. This process consists of invoking the key record encrypt algorithm described in co-pending patent application Ser. No. 07/766,260 ("Public Key Cryptosystem Key Management Based on Control Vectors"), passing as arguments a control vector produced from the control vector in the external PU key token (as explained in co-pending patent application Ser. No. 07/602,989, "Method and Apparatus for Controlling the Use of a Public Key, Based on the Level of Import Integrity for the Key"), and the clear key record contained in the external PU key token. The outputs of the key record encrypt algorithm are the encrypted PU key record and encrypted authenticator record to be stored in the internal PU key token. The control vector stored in the internal PU key token is just the control vector passed as an input to the key record encrypt algorithm and the header stored in the internal PU key token is just the same header stored in the external PU key token except updated as necessary with length and displacement information permitting each of the fields to be accessed and recovered and updated to reflect that this is an internal PU key token instead of an external PU key token. FIG. 16 illustrates the format of an internal PU key token. The internal PU key token consists of a header, a control vector, an encrypted PU key record, and an encrypted authenticator record. Referring to FIG. 15, there is shown a CF 30 with an IPUK instruction 133, which executes in instruction processor 142. Instruction processor 142 is not shown in FIG. 15. The IPUK instruction has as inputs an external PU key token containing the public key to be imported and an optional length parameter indicating the length of the external PU key token. The IPUK instruction also has an option for verifying a digital signature produced on the external PU key token using a public key contained in an internal PU key token supplied as an input to the IPUK instruction (not shown in FIG. 15). The IPUK instruction produces, as outputs, an internal PU key token containing the imported public key and an optional length parameter indicating the length of the produced internal PU key token. Thus, in the example of devices A and B, device A executes an IPUK instruction to import an external PU key token containing PUAb, the public device authentication key of device B, and device B executes an IPUK instruction to import an external PU key token containing PUAa, the public device authentication key of device A. Thus, before the ECFER and ICFER instructions are executed, it is assumed that the appropriate cryptographic devices participating in backup and recovery have exchanged their respective PUA keys and that these PUA keys have been imported at the designated receiving devices using an IPUK instruction.

ECFER and ICFER Instructions: A description of the ECFER instruction is provided below:

| Export Crypto Facility Environment Record (ECFER) | |
|---|---|
| EQUATION: | |
| protocol-mode | /2b minimum/ |
| KM-mode | /1b minimum/ |
| KMP-mode | /1b minimum/ |
| hash-rule | /3b minimum/ |
| PU-key-token-length | /16b/ |
| PU-key-token | /unspecified/ |
| → | |
| xcfer-length | /32b/ |
| xcfer | /unspecified/ |
| cfbdkb-length | /16b/ |
| ePUAb(cfbdkb) | /unspecified/ |
| dsig-length | /16b/ |
| dsig | /unspecified/ |
| CC | /unspecified/ |

| PARAMETER DEFINITIONS: | |
|---|---|
| INPUTS | DESCRIPTION |
| PROTOCOL-MODE | The protocol-mode parameter specifies the protocol used for export and import of the CF environment, as follows:<br>o 0: reserved<br>o 1: CBKUP1 (certification-center protocol where the imported PUA key is signed with PRC, a private certification key of the certification center).<br>o 2: CBKUP2 (certification center protocol |

-continued

| PARAMETER DEFINITIONS: | |
|---|---|
| | where the iported PUAb key is signed with PRMb, a private key management key belonging to the same device to which PUAb belongs) |
| | o 3 : PBKUP (private protocol, i.e., the imported PUAb key is imported with no special restrictions) |
| | Note that the control vector for PUAb (located in the internal PU key token for PUAb) contains a backup protocol field (called BKUP PROTOCOL) that must match the protocol-mode parameter. |
| KM-MODE | The KM-mode parameter indicates whether the master key KM is required to be entered into the new KM register at the receiving device via the Load First Master Key Part (LFMKP) and Combine Master Key Parts (CMKP) instructions: |
| | o KM-Mode=0 : no |
| | o KM-mode=1 : yes (load via KFMKP and CMKP) |
| | NOTE: KM is a master key used to encrypt DEA keys for storage (outside CF 30) in the cryptographic key data set 32. |
| | NOTE: The LFMKP and CMKP instructions are discussed in co-pending patent application serial number 07/766,260 ("Public Key Cryptosystem Key Management Based on Control Vectors"), cited in the Background Art. |
| | NOTE: KM-mode=1 should be selected only if the value of KM is known outside the crypto facility, i.e., KM was originally loaded into the CF of the sending device via the LFMKP and CMKP instructions. |
| KMP-MODE | The KMP-mode parameter indicates wheter the PKA master key KMP is required to be entered into the new KMP register at the receiving device via the Load First PKA Master Key Part (LFPMKP) and combine PKA Master Key Parts (CPMKP) instructions: |
| | o KMP-mode = 0 : no |
| | o KMP-mode = 1 : yes (load via LFPMKP and CPMKP) |
| | NOTE: KMP is a master key used to encrypt PU and PR key records for storage (outside CF 30) in the cryptographic key data set 32. |
| | NOTE: The LFPMKP and CPMKP instructions are discussed in co-pending patent application serial number 07/766,260 ("Public Key Cryptosystem Key Management Based on Control Vectors"), cited in the Background Art. |
| | NOTE: KMP-mode=1 should be selected only if the value of KMP is known outside the crypto facility, i.e., KMP was originally loaded into the CF of the sending device via the LFPMKP and CPMKP instructions. |
| HASH-RULE | Specifies the hash algorithm to be used to calculate a hash value on ePUAb(cfbdkb) and on the cfer. The encoding of the hash-rule is as follows: |
| | o hash-rule = 0 : MDC-2 algorithm |
| | o hash-rule = 1 : MDC-4 algorithm |
| | o hash-rule = 2-7 : reserved |
| | NOTE: The MDC-2 algorithm (2 DEA encryption steps per 64 bits of input) and the MDC-4 algorithm (4 DEA encryption steps per 64 bits of input) are described in U.S. Pat. No. 4,908,861. |
| PU-KEY-TOKEN-LENGTH | The length of PU-key-token in bytes. |
| PU-KEY-TOKEN | An Internal PU Key Token containing PUAb of device "b". Note that "a" is this device and "b" is the other device. |
| OUTPUTS | DESCRIPTION |
| XCFER-LENGTH | The length of xcfer in bytes. |
| XCFER | An External Crypto Facility Environment Record. |
| CFBDKB-LENGTH | The length of cfbdkb and ePUAb(cfbdkb) in bits. |
| EPUAB(CFBDKB) | cfbdkb encrypted with public key PUAb of device "b". The Encrypted Secret Part (ESP) in xcfer is encrypted with a key stored in cfbdkb. cfbdkb also contains a 128-bit hash value (MDC) calculated on cfer. |
| DSIG-LENGTH | The length of dsig in bits. |
| DSIG | A digital signature produced from a signature record prepared by the ECFER instruction and a |

| | -continued |
|---|---|
| | PARAMETER DEFINITIONS: |
| | private authentication key PRAa of device "a", in accordance with section 6 of International Standards Organization Draft International Standard (ISO DIS) 9796. The signature record contains, at least, a 128-bit hash value calculated on ePUAb(cfbdkb). |
| CC | Condition code indicating success or failure of the instruction execution. |

DESCRIPTION

The Export Crypto Facility Environment Record instruction constructs an External Crypto Facility Environment Record, xcfer, an encrypted Crypto Facility Backup Key Block, ePUAb(cfbdkb), and a digital signature, dsig. dsig is calculated from a signature record prepared by the ECFER instruction and a private authentication key PRAa. Subscripts "a" and "b" designate this device and another device, respectively. For example, "a" designates the exporting device executing the ECFER instruction and "b" designates the importing device executing the ICFER instruction. The signature record contains a hash value (e.g., an MDC) calculated on ePUAb(cfbdkb), i.e., the digital signature authenticates ePUAb(cfbdkb). cfbdkb contains a similar hash value (e.g., an MDC) calculated on the concatenation of the secret and non-secret parts of the portable part, which permits the portable part to be authenticated. The keys, cryptographic variables, and data comprising the portable part are stored in a data record called the CF-Environment Record, consisting of a secret part (SP) and a non-secret part (NSP). The encrypted SP and the NSP together form the XCFER. Both hash values (i.e., the hash value in the signature record and the hash value in cfbdkb) are calculated using the same hash algorithm, as specified in the hash-rule parameter of the ECFER instruction. cfbdkb also contains a 128 bit key KK2 used to encrypt the Secret Part (SP) of xcfer, where KK2 = KK1 xor X xor Y. The values X and Y are determined as follows: (1) X := KMP if KMP-mode = 1 and X := 0 if KMP = mode = 0, and (2) Y := KM if KM-mode = 1 and Y := 0 if KM-mode = 0.

Any one of three protocol modes may be used to export and import a CF-Environment Record (CFER): (a) PBKUP, (b) CBKUP1, and (c) CBKUP2. The PBKUP (i.e., private protocol) mode is the least restrictive. This mode permits an installation to effect device backup using privately exchanged PUA keys. The CBKUP1 and CBKUP2 modes make use of a certification center to indirectly validate the PUA key, and thus are more restrictive. In the CBKUP2 mode, the control vector of the PUA key stored in the PUA key token must indicate via an import history field that the imported PUA key is signed with a private key management key (PRM) belonging to the same device to which PUA belongs, and that it was successfully validated using PUM, the public key associated with PRM. In addition, it must also be the case that the mentioned imported PUM key must itself be signed with PRC, the private key of the certification center, and successfully validated with PUC, the public key of the certification center. In the CBKUP1 mode, the control vector of the PUA key stored in the PUA key token must indicate via an import history field that the imported PUA key is signed with PRC, the private key of the certification center, and that it was successfully validated using PUC, the public key of the certification center. The concept of an import history field in the control vector is described and discussed in co-pending patent application Ser. No. 07/748,407 ("A Hybrid Public Key Algorithm/Data Encryption Algorithm Key Distribution Method Based on Control Vectors"), cited in the Background Art.

Several mechanisms are provided to authorize and control the execution of the ECFER instruction. These control mechanisms are effected via the configuration vector, the control vectors, and the instruction parameters. The ECFER and ICFER instructions are designed to operate only if both the exporting and importing devices "agree" to use the same protocol and protocol options. In effect, this means that both devices must be configured the same (i.e., both configuration vectors must be the same with respect to device backup), both devices must use the same key management protocol, and the same parameter options must be specified to the ECFER and ICFER instructions. The following addition conditions are enforced: (1) the method of loading or generating KMP at the exporting and importing devices must be the same, and (2) when protocol-mode = 1 or 2 the PUC keys (or PUM and PUC keys) used at the exporting and importing devices to import the PUA keys must be the same. A HIST-DOMAIN ID field in the state vector of a cloned CF environment provides a record of the domain identifier of the PUC keys (or PUC and PUM keys) used to import the PUA keys when protocol modes 1 or 2 are used. By using the Export CF Audit Record (ECFAR) instruction, a cloned device can be audited to ensure that backup and recovery was effected with the proper PUC key. The ECFAR instruction is described in co-pending patent application Ser. No. 07/766,260 ("Public Key Cryptosystem Key Management Based on Control Vectors"), cited in the Background Art. Agreement between the exporting and importing devices is effected through the use of a record code field in the Crypto Facility Backup DEA Key Record and through direct comparisons of the information stored in the CFER produced at the exporting device and the CF Environment of the importing device.

The ECFER and ICFER instructions provide an option requiring the master key KM and/or the PKA master key KMP to be reentered at the importing (or receiving) device. In that case, the key KK1 under which the Secret Part of xcfer is encrypted can be recovered at the receiving device only if the required values of KM and/or KMP have been properly entered. This option permits a CF Environment to be ported without exposing KM or KMP to any greater extent than would otherwise be required for ordinary manual key entry at a sending or receiving device.

Figure 17:
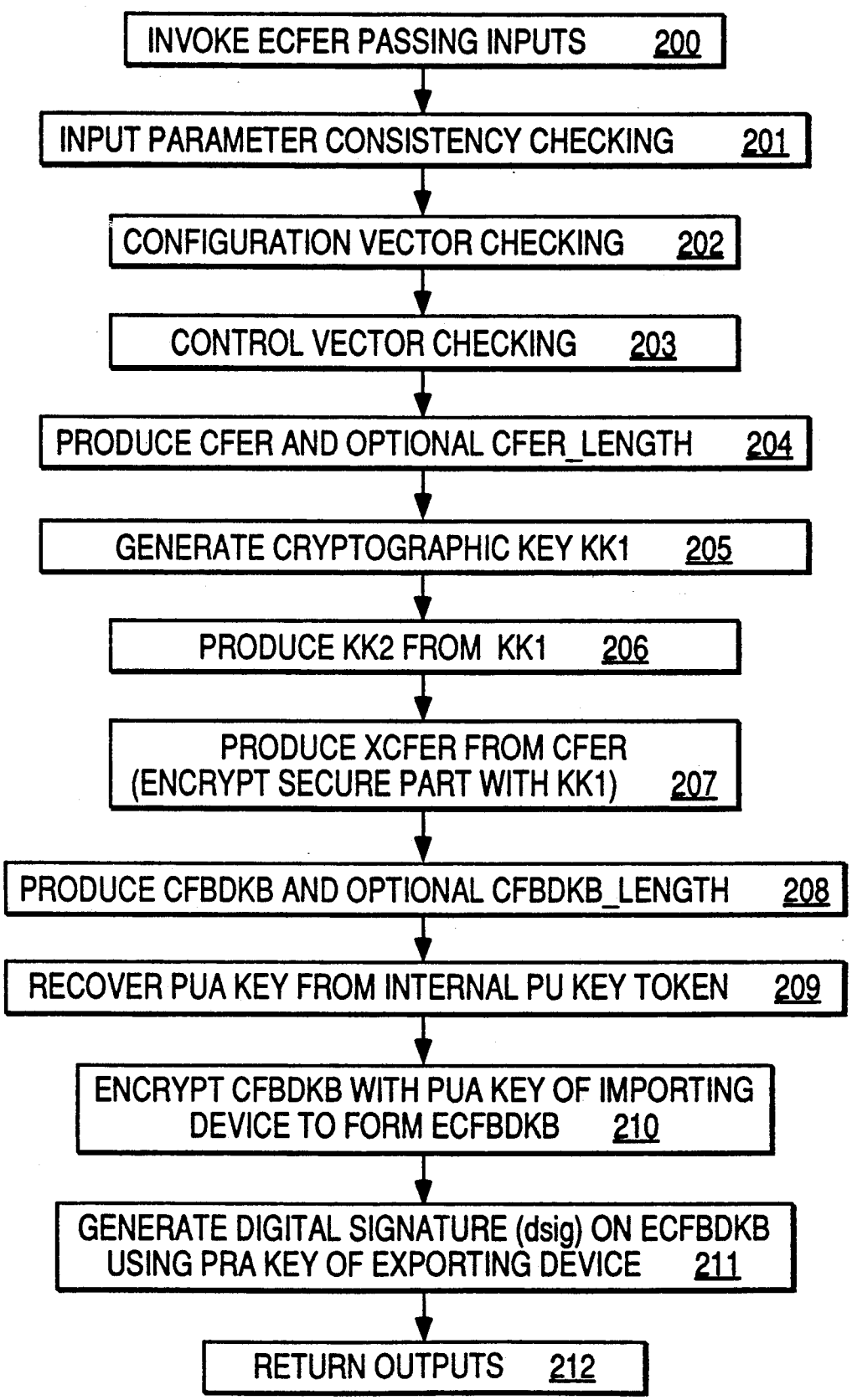
FIG. 17 is a block diagram illustration of the computational steps performed by the ECFER instruction.

FIG. 17 is a block diagram illustration of the computational steps performed by the ECFER instruction. At step 200, the ECFER instruction is invoked with the following set of parameters supplied as inputs: protocol-mode, KM-mode, KMP-mode, hash-rule, PU-key-token-length, and PU-key-token. At step 201, the input parameters are checked for consistency. For example, PU-key-token is checked to ensure that the length and displacement information in the header is consistent with PU-key-token-length. Other parameters are checked to ensure that they fall within the allowed range of codepoints. If checking fails, the ECFER instruction is aborted; otherwise processing continues. At step 202, the input parameters protocol-mode, KM-mode, and KMP-mode are checked for consistency against information stored in the configuration vector contained in the Crypto Facility Environment 146 of CF 30 (i.e., at device A). For example, a BKUP PROTOCOL field in the configuration vector prescribes the permitted backup protocol modes that are permitted. The protocol-mode parameter is checked for consistency against the BKUP PROTOCOL field in the configuration vector. The KM-mode and KMP-mode parameters declare whether the DEA master key (KM) and the PKA master key (KMP) are to be reloaded or not reloaded at the importing device. The present invention contemplates the use of two master keys, a first master key KM used to encrypt DEA keys stored in a cryptographic key data set 32 and a second master key KMP used to encrypt PU and PR key records in PU and PR key tokens, respectively, stored in a cryptographic key data set 32. A KMP RELOAD field in the configuration vector prescribes whether KMP must be reloaded or not. A KM RELOAD field in the configuration vector prescribes whether KM must be reloaded or not. The KM-load and KMP-load parameters are checked for consistency against the KM RELOAD and KMP RELOAD fields in the configuration vector. If checking fails, the ECFER instruction is aborted; otherwise processing continues.

At step 203, control vector checking is performed. The control vector C1 associated with the PUAb key, i.e., the public device authentication key of device B contained in PU-key-token, is checked first. This step includes, but is not limited to, verifying that (a) CV TYPE of C1 is 'public device authentication key', (b) ECFER usage in C1 is enabled, (c) current date/time is within the prescribed limits, i.e., greater than the start date/time and less then the end date/time, (d) the LPID value recorded in C1, which is also called the Environment Identifier (EID), is different from the LPID value stored in the CF Environment of the CF 30, and (e) history information recorded in C1 indicates that PUAb has been imported using the IPUK instruction. History information recorded in C1, which indicates the level of integrity used in the IPUK instruction to import PUAb, is also checked against a minimum acceptable threshold level for the ECFER and ICFER instructions (i.e., for backup and recovery), to ensure that PUAb has been imported with a level of integrity permitted or prescribed by the configuration vector. The philosophy pursued in importing keys is to permit keys to be imported with any desired level of integrity, but to record that level of integrity as history information in the control vector as part of the importing process. Later, when a key is processed, the history information in the control vector is checked to ensure that the level of import integrity meets whatever threshold has been pre-established for it. Different thresholds can be set for different intended uses of the key. Thus, for backup and recovery, a first threshold may apply whereas for signature generation and signature verification a different threshold may apply. The step of control vector and configuration vector checking is an important part of the process of backup and recovery, as it is the means by which the process can be securely controlled. If checking fails, the ECFER instruction is aborted; otherwise processing continues.

At step 204, secret and non-secret information in the portable part 104 is used to produce a CF Environment Record (i.e., a CFER). This step consists of moving and formatting information. In implementations where the CFER may be a variable length record, an optional CFER-length output parameter is calculated.

At step 205, cryptographic key KK1 is generated. In the preferred embodiment, KK1 is a 128-bit key equal to the length of the master keys KM and KMP (also assumed to be 128-bit keys). However, those skilled in the art will recognize that keys of other lengths could be used by the invention so that the invention is not limited to the use of keys of a particular length. KK1 is produced by invoking a key generation algorithm. The key generation algorithm invokes a pseudorandom number generator to produce the key, which may then be adjusted for parity (say odd parity). Instead of a pseudorandom number generator, a true random number generator can be used. At step 206, cryptographic key KK2 is produced from KK1, as follows. If KM-mode=1, then KK1 is Exclusive-ORed with master key KM to produce intermediate value X. Otherwise, if KM-mode=0, then X is set equal to KK1. If KMP-mode=1, then X is Exclusive-ORed with master key KMP to produce final value KK2 Otherwise, if KMP-mode=0, then KK2 is set equal to X. For example, if KM-mode=1 and KMP-mode=1, then KK2=KK1+KM+KMP where "+" denotes the Exclusive OR operation. On the other hand, if KM-mode=0 and KMP-mode=0, then KK2=KK1.

At step 207, the XCFER is produced from the CFER. This is accomplished by encrypting the secret part of the CFER with the key KK1. Different methods of encryption may be used. Note that at step 204, the SP may be padded in order to make its length a multiple of the encryption algorithm block size. For example, if SP denotes the secret part, then SP is encrypted with the leftmost 64-bits of KK1 using CBC mode of encryption with an initial chaining value of 0, the result is decrypted with the rightmost 64-bits of KK1 using CBC mode of encryption with an initial chaining value of 0, and that result is encrypted with the leftmost 64-bits of KK1 using CBC mode of encryption with an initial chaining value of 0. Note that it shall be assumed for convenience that KK1 is a DEA key and the CBC mode of encryption is performed with the Data Encryption Algorithm (DEA).

At step 208, a Crypto Facility Backup DEA Key Record (CFBDKR) is produced. The CFBDKR contains, but is not limited to, (a) cryptographic key KK2, (b) a 128-bit MDC calculated on the clear CFER using a cryptographic one-way hash algorithm as specified by the input hash-rule parameter, (c) a copy of the protocol-mode parameter, KM-mode parameter, and KMP-mode parameter, to be used for consistency checking in the ICFER instruction, and (d) a copy of the hash-rule parameter to inform the ICFER instruction of what hash algorithm to use in calculating the MDC. The CFBDKR is padded as necessary to form a Crypto Facility Backup DEA Key Block (CFBDKB). In implementations where the CFBDKB may be a variable length block, an optional CFBDKB-length output parameter is calculated. At step 209, the PUAb key, i.e, the public device authentication key of device B, is recovered from PU-key-token. This is accomplished by invoking key record decrypt algorithm 13 described in FIG. 15 of co-pending patent application Ser. No. 07/766,260 ("Public Key Cryptosystem Key Management Based on Control Vectors"), cited in the Background Art, and passing as inputs the control vector, encrypted key record, and encrypted key authenticator record contained in PU-key-token. At step 210, the CFBDKB is encrypted with PUAb using the public key algorithm to form the ECFBDKB. For example, if the public key algorithm is the RSA algorithm, then encryption consists of raising CFBDKB to the power of an exponent e modulo a modulus n, where e and n constitute the public key. At step 211, a digital signature (dsig) is calculated on the ECFBDKB using PRAa, the private device authentication key of the exporting device. PRAa is stored in the CF Environment 146 of the CF 30, and hence is available for use by the ECFER instruction. dsig is produced by first calculating a MDC or hash value on the ECFBDKB using a cryotpgraphic one-way hash algorithm as specified by input parameter hash-value. The so-produced MDC is then processed to produce a signature block which is then decrypted with PRAa to produce dsig. The process of producing signature block form MDC may be based on, but is not limited to, the method described in International Standards Organization Draft International Standard (ISO DIS) 9796. In implementations where the dsig may be variable length, an optional dsig-length output parameter is calculated. At step 212, XCFER-length, XCFER, CFBDKB-length, encrypted CFBDKB (i.e., DCFBDKB), dsig-length, dsig, and a condition code are returned as outputs.

A description of the ICFER instruction is provided below:

| Import Crypto Facility Environment Record (ICFER) | |
|---|---|
| EQUATION: | |
| PARAMETER DEFINITIONS: | |
| protocol-mode | /2b minimum/ |
| KM-mode | /1b minimum/ |
| KMP-mode | /1b minimum/ |
| PU-key-token-length | /16b/ |
| PU-key-token | /unspecified/ |
| xcfer-length | /32b/ |
| xcfer | /unspecified/ |
| cfbdkb-length | /16b/ |
| ePUAb(cfbdkb) | /unspecified/ |
| dsig-length | /16b/ |
| dsig | /unspecified/ |
| → | |
| CC | /unspecified/ |

| INPUTS | PARAMETER DEFINITIONS: DESCRIPTION |
|---|---|
| PROTOCOL-MODE | The protocol-mode parameter specifies the protocol used for export and import of the CF environment, as follows:<br>o 0: reserved<br>o 1: CBKUP1 (certification center protocol where the imported PUA key is signed with PRC, a private certification key of the certification center).<br>o 2: CBKUP2 (certification center protocol where the imported PUAb key is signed with PRMb, a private key management key belonging to the same device to which PUAb belongs)<br>o 3: PBKUP (private protocol, i.e., the imported PUAb key is imported with no special restrictions)<br>Note that the control vector for PUAa (located in the internal PU key token for PUAa) contains a backup protocol field (called BKUP PROTOCOL) that must match the protocol-mode parameter. |
| KM-MODE | The KM-mode parameter indicates whether the master key KM is required to be entered into the new KM register at the receiving device via the Load First Master Key Part (LFMKP) and Combine Master Key Parts (CMKP) instructions:<br>o KM-mode=0 : no<br>o KM-mode=1 : yes (load via LFMKP and CMKP)<br>NOTE: KM is a master key used to encrypt DEA keys for storage (outside CF 30) in the cryptographic key data set 32.<br>NOTE: The LFMKP and CMKP instructions are discussed in co-pending patent application serial number 07/766,260 ("Public Key Cryptosystem Key Management Based on Control Vectors"), cited in the Background Art.<br>NOTE: KM-mode=1 should be selected only if the value of KM is known outside the crypto facility, i.e., KM was originally loaded into the CF of the sending device via the LFMKP and CMKP instructions. |
| KMP-MODE | The KMP-mode parameter indicates whether the PKA master key KMP is required to be entered into the new KMP register at the receiving device via the Load First PKA Master Key Part (LFPMKP) and Combine PKA Master Key Parts (CPMKP) instructions: |

-continued

| INPUTS | PARAMETER DEFINITIONS: DESCRIPTION |
|---|---|
| | o  KMP-mode = 0 : no |
| | o  KMP-mode = 1 : yes (load via LFPMKP and CPMKP) |
| | NOTE: KMP is a master key used to encrypt PU and PR key records for storage (outside CF 30) in the cryptographic key data set 32. |
| | NOTE: The LFPMKP and CPMKP instructions are discussed in co-pending patent application serial number 07/766,260 ("Public Key Cryptosystem Key Management Based on Control Vectors"), cited in the Background Art. |
| | NOTE: KMP-mode=1 should be selected only if the value of KMP is known outside the crypto facility, i.e., KMP was originally loaded into the CF of the sending device via the LFPMKP and CPMKP instructions. |
| PU-KEY-TOKEN-LENGTH | The length of PU-key-token in bytes. |
| PU-KEY-TOKEN | An Internal PU Key Token containing PUAa of device "a". Note that "a" is the other device and "b" is this device. |
| XCFER-LENGTH | The length of xcfer in bytes. |
| XCFER | An External Crypto Facility Environment Record. |
| CFBDKB-LENGTH | The length of cfbdkb and ePUAb(cfbdkb) in bits. |
| EPUAB(CFBDKB) | cfbdkb encrypted with public key PUAb of device "b". The Encrypted Secret Part (ESP) in xcfer encrypted with a key stored in cfbdkb. cfbdkb also contains a 128-bit hash value (MDC) calculated on cfer. |
| DSIG-LENGTH | The length of dsig in bits. |
| DSIG | A digital signature produced from a signature record prepared by the EDFER instruction and a private authentication key PRAa of device "a", e.g., in accordance with section 6 of International Standards Organization Draft International Standard (ISO DIS) 9796. The signature record contains, at least, a 128-bit hash value calculated on ePUAb(cfbdkb). |
| OUTPUTS | DESCRIPTION |
| CC | Condition code indicating success or failure of the instruction execution. |

DESCRIPTION

The ICFER instruction permits an xcfer produced with an ECFER instruction, at a sending device, to be imported at a receiving device. In effect, the output of an ECFER instruction becomes the input to an ICFER instruction. Execution of the ICFER instruction causes the variables stored in the xcfer to replace the comparable variables in the CF Environment of the receiving device.

The inputs to the ICFER instruction consist of an External Crypto Facility Environment Record, xcfer, an encrypted Crypto Facility Backup Key Block, ePUAb(cfbdkb), and a digital signature, dsig. dsig is calculated from a signature record prepared by the ECFER instruction and a private authentication key PRAa. Subscripts "b" and "a" designate this device and another device, respectively. The signature record contains a hash value (e.g., an MDC) calculated on ePUAb(cfbdkb), i.e., the digital signature authenticates ePUAb(cfbdkb). The keys, cryptographic variables, and data comprising the portable part are stored in a data record called the CF-Environment Record, consisting of a secret part (SP) and a non-secret part (NSP). The encrypted SP and the NSP together form the XCFER. cfbdkb contains a similar hash value (e.g., an MDC) calculated on the CF-Environment Record (CFER), which permits the portable part to be authenticated. Both hash values (i.e., the has value in the signature record and the hash value in cfbdkb) are calculated using the same hash algorithm, as specified in the hash-rule parameter of the ECFER instruction. cfbdkb also contains a 128 bit key KK2, where KK2=KK1 xor X xor Y. KK1 is a 128 bit key used to encrypt the Secret Part (SP) of xcfer. The values X and Y are determined as follows: (1) X :=KMP if KMP-mode=1 and X :=0 if KMP=mode=0, and (2) Y :=KM if KM-mode=1 and Y :=0 if KM-mode=0.

Any one of three protocol modes may be used to export and import a CF-Environment Record (CFER): (a) PBKUP, (b) CBKUP1, and (c) CBKUP2. The PBKUP (i.e., private protocol) mode is the least restrictive. This mode permits an installation to effect device backup using privately exchanged PUA keys. The CBKUP1 and CBKUP2 modes make use of a certification center to indirectly validate the PUA key, and thus are more restrictive. In the CBKUP2 mode, the control vector of the PUA key stored in the PUA key token must indicate via an import history field that the imported PUA key is signed with a private key management key (PRM) belonging to the same device to which PUA belongs, and that it was successfully validated using PUM, the public key associated with PRM. In addition, it must also be the case that the mentioned imported PUM key must itself be signed with PRC, the private key of the certification center, and successfully validated with PUC, the public key of the certification center. In the CBKUP1 mode, the control vector of the PUA key stored in the PUA key token must indicate via an import history field that the imported PUA key is signed with PRC, the private key of the certification center, and that it was successfully validated using PUC, the public key of the certification center. The concept of an import history field in the control vector is described and discussed in co-pending patent application Ser. No. 07/602,989 ("Method and Apparatus for Controlling the Use of a Public Key, Based on the Level of Import Integrity for the Key"), cited in the Background Art.

Several mechanisms are provided to authorize and control the execution of the ICFER instruction. These control mechanisms are effected via the configuration vector, the control vectors, and the instruction parameters. The ECFER and ICFER instructions are designed to operate only if both the exporting and importing devices "agree" to use the same protocol and protocol options. In effect, this means that both devices must be configured the same (i.e., both configuration vectors must be the same with respect to device backup), both devices must use the same key management protocol, and the same parameter options must be specified to the ECFER and ICFER instructions. The following additional conditions are enforced: (1) the method of loading or generating KMP at the exporting and importing devices must be the same, and (2) when protocol-mode=1 or 2 the PUC keys (or PUM and PUC keys) used at the exporting and importing devices to import the PUA keys must be the same. A HIST-DOMAIN ID field in the state vector of a cloned CF environment provides a record of the domain identifier of the PUC keys (or PUC and PUM keys) used to import the PUA keys when protocol modes 1 or 2 are used. The control vector for each public and private key contains a DOMAIN ID field indicating the domain in which the key is intended to operate. By using the Export CF Audit Record (ECFAR) instruction, a cloned device can be audited to ensure that backup and recovery was effected with the proper PUC key. The ECFAR instruction is described in co-pending patent application Ser. No. 07/766,260 ("Public Key Cryptosystem Key Management Based on Control Vectors"), cited in the Background Art. Agreement between the exporting and importing devices is effected through the use of a record code field in the Crypto Facility Backup DEA Key Record and through direct comparisons of the information stored in the CFER produced at the exporting device and the CF Environment of the importing device.

The ECFER and ICFER instructions provide an option requiring the master key KM and/or the PKA master key KMP to be reentered at the importing (or receiving) device. In that case, the key KK1 under which the Secret Part of xcfer is encrypted can be recovered at the receiving device only if the required values of KM and/or KMP have been properly entered. This option permits a CF Environment to be ported without exposing KM or KMP to any greater extent than would otherwise be required for ordinary manual key entry at a sending or receiving device. To permit recovery, KMP must be reentered into the NKMP register and KM must be reentered into the NKM register using the CF instructions.

Figure 18:
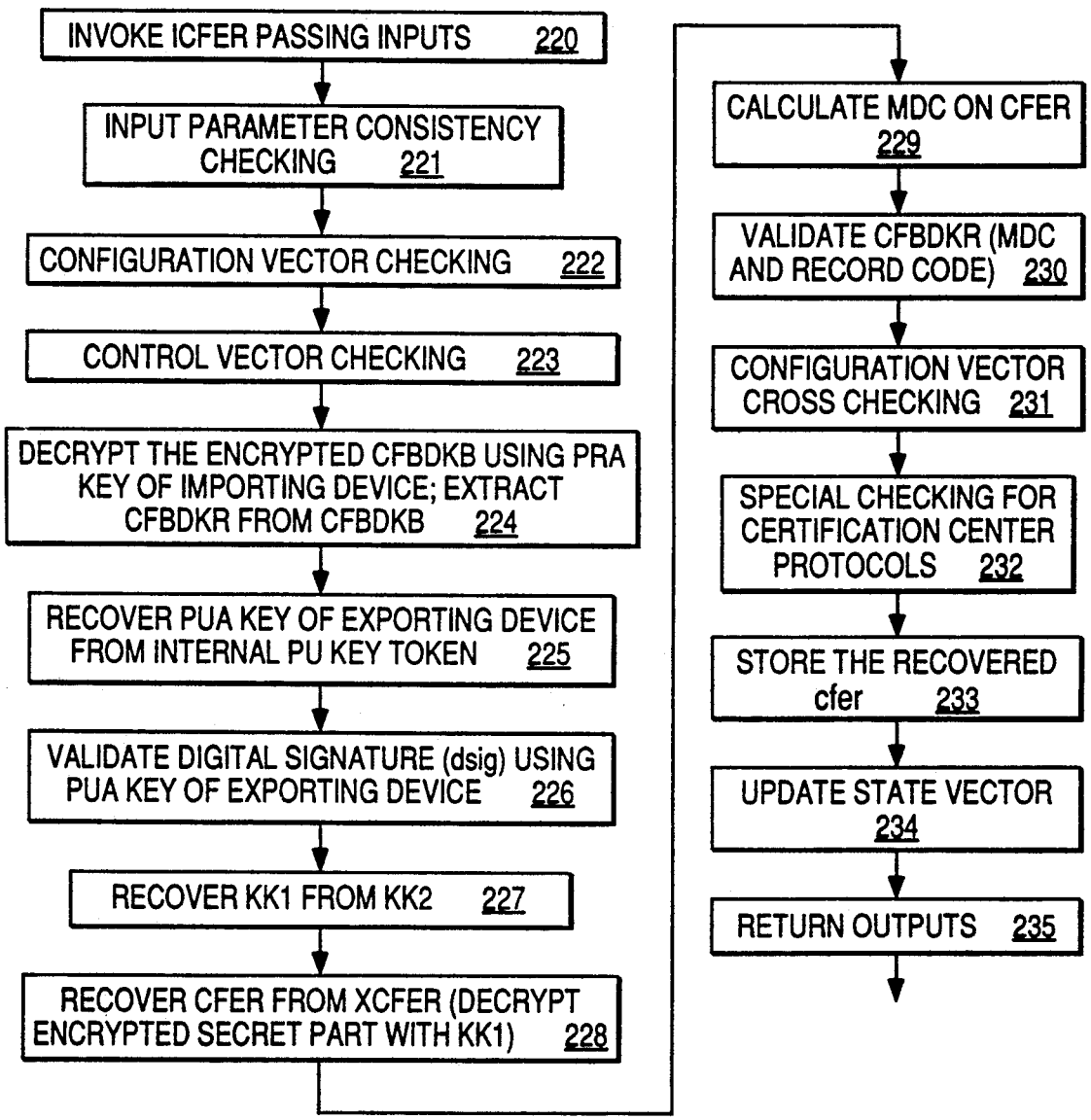
FIG. 18 is a block diagram illustration of the computational steps performed by the ICFER instruction.

FIG. 18 is a block diagram illustration of the computational steps performed by the ICFER instruction. At step 220, the ICFER instruction is invoked with the following set of parameters supplied as inputs: protocol-mode, KM-mode, KMP-mode, hash-rule, PU-key-token-length, and PU-key-token, XCFER-length, XCFER, CFBDKB-length, encrypted CFBDKB (i.e., ECFBDKB), dsig-length, and dsig. At step 221, the input parameters are checked for consistency. For example, PU-key-token is checked to ensure that the length and displacement information in the header is consistent with PU-key-token-length. The XCFER can also be checked to ensure that the length and displacement information in the header is consistent with XCFER-length. Other parameters are checked to ensure that they fall within the allowed range of codepoints. At step 222, the input parameters protocol-mode, KM-mode, and KMP-mode are checked for consistency against information stored in the configuration vector contained in the Crypto Facility Environment 146' of CF 30' (i.e., at device B). For example, a BKUP PROTOCOL field in the configuration vector prescribes the permitted backup protocol modes that are permitted. The protocol-mode parameter is checked for consistency against the BKUP PROTOCOL field in the configuration vector. The KM-mode and KMP-mode parameters declare whether the DEA master key (KM) and the PKA master key (KMP) are to be reloaded or not reloaded at the importing device. The present invention contemplates the use of two master keys, a first master key KM used to encrypt DEA keys stored in a cryptographic key data set 32 and a second master key KMP used to encrypt PU and PR key records in PU and PR key tokens, respectively, stored in a cryptographic key data set 32. Unlike the ECFER instruction where the KMP RELOAD and KM RELOAD fields in the configuration vector are checked, in the ICFER instruction a different sort of checking is performed. If KM-mode=1, then a check is performed to ensure that KM has been reloaded into the cryptographic facility (e.g., a flag bit is checked to ensure that KM has been loaded into the new KM register). If KMP-mode-1, then a check is performed to ensure that KMP has been reloaded into the cryptographic facility (e.g., a flag bit is checked to ensure that KMP has been loaded into the new KMP register). Of course, this checking does not ensure that the proper key values have been loaded, but only that keys have been loaded. If checking fails, the ECFER instruction is aborted; otherwise processing continues.

At step 223, control vector checking is performed. The control vector C1 associated with the PUAa key, i.e., the public device authentication key of device A contained in PU-key-token, is checked first. This step includes, but is not limited to, verifying that (a) CV TYPE of C1 is 'public device authentication key', (b) ICFER usage in C1 is enabled, (c) current date/time is within the prescribed limits, i.e., greater than the start date/time and less then the end date/time, (d) the LPID value recorded in C1, which is also called the Environment Identifier (EID), is different from the LPID value stored in the CF Environment of the CF 30, and (e) history information recorded in C1 indicates that PUAa has been imported using the IPUK instruction. History information recorded in C1, which indicates the level of integrity used in the IPUK instruction to import PUAb, is also checked against a minimum acceptable threshold level for the ECFER and ICFER instructions (i.e., for backup and recovery), to ensure that PUAa has been imported with a level of integrity permitted or prescribed by the configuration vector. The philosophy pursued in importing keys is to permit keys to be imported with any desired level of integrity, but to record that level of integrity as history information in the control vector as part of the importing process. Later, when a key is processed, the history information in the control vector is checked to ensure that the level of import integrity meets whatever threshold has been pre-established for it. Different thresholds can be set for different intended uses of the key. Thus, for backup and recovery, a first threshold may apply whereas for signature generation and signature verification a different threshold may apply. The step of control vector and configuration vector checking is an important part of the process of backup and recovery, as it is the means by which the process can be securely controlled. If checking fails, the ICFER instruction is aborted; otherwise processing continues.

At step 224, the encrypted CFBDKB (i.e., ECFBDKB) is decrypted with the public key algorithm using PRAb, the private device authentication key of device B. PRAb is stored in the CF Environment 146' of the CF 30', and hence is available for use by the ICFER instruction. For example, if the public key algorithm is the RSA algorithm, then decryption consists of raising the ECFBDKB to the power of an exponent d modulo a modulus n, where d and n constitute the private key. The CFBDKR is then extracted from the CFBDKB, e.g., by discarding added pad bits. At step 225, the PUAa key, i.e, the public device authentication key of device A, is recovered from PU-key-token. This is accomplished by invoking key record decrypt algorithm 13 described in FIG. 15 of co-pending patent application Ser. No. 07/766,260 ("Public Key Cryptosystem Key Management Based on Control Vectors"), cited in the background art, and passing as inputs the control vector, encrypted key record, and encrypted key authenticator record contained in PU-key-token. At step 226, the digital signature generated on the ECFBDKB (i.e., dsig) is verified using PUAa, the public device authentication key of device A. The process starts by first calculating an MDC or hash value on the ECFBDKB using a cryptographic one-way hash algorithm as specified by the value of hash-value stored in the recovered CFBDKR. dsig is next encrypted with PUAa to recover a clear signature block. The recovered signature block is next processed to recover the MDC or hash value stored within it. The process of recovering the MDC from the signature block may be based on, but is not limited to, the method described in International Standards Organization Draft International Standard (ISO DIS) 9796. The calculated MDC is then compared for equality with the recovered MDC. If the MDC values are equal, then processing continues, otherwise processing is aborted. At step 227, cryptographic key KK1 is recovered from the value of cryptographic key KK2 stored in the recovered CFBDKR. If KM-mode=1, then KK2 is Exclusive-ORed with master key KM to produce intermediate value X. Otherwise, if KM-mode=0, then X is set equal to KK2. If KMP-mode=1, then X is Exclusive-ORed with master key KMP to produce final value KK1 Otherwise, if KMP-mode=0, then KK1 is set equal to X. The reader will appreciate that the steps here invert the process of step 206 in FIG. 17. At step 228, CFER is recovered from XCFER by decrypting the encrypted secret part in XCFER with KK1. The method of decrypting used here must be the inverse operation of encryption used in step 207 of FIG. 17 At step 229, an MDC or hash value is calculated on the clear recovered CFER using a cryptographic one-way hash algorithm as specified by the value of hash-value stored in the clear recovered CFBDKR. At step 230, information in the recovered CFBDKR is validated. The process of validation consists of (a) verifying that the copies of the protocol-mode parameter, KM-mode parameter, and KMP-mode parameter stored in the CFBDKR are equal in value to the protocol-mode parameter, KM-mode parameter, and KMP-mode parameter supplied as inputs to the ICFER instruction, respectively, and (b) verifying that the MDC calculated at step 229 is equal to the MDC value stored in the CFBDKR. If checking fails, the ICFER instruction is aborted; otherwise processing continues. At step 231, the configuration vector in the CFER is cross checked for consistency with the configuration vector in the CF Environment 146' of CF 30'. This checking includes, but is not limited to, ensuring that the restrictions for importing PUAb at device A are the same as, or at the very least consistent with, the restrictions for importing PUAa at device B. At step 232, special checking for certification center protocols is performed. In situations where protocol-mode=CBKUP1 or protocol-mode=CBKUP2 is specified, history information in C1 (the control vector associated with PUAa), in the state vector in the CFER, and in the state vector in the CF Environment 146' of CF 30' are cross checked to ensure that both devices, A and B, use the certification center and public certification key, PUC, for importing keys via the IPUK instruction. At step 233, the secret and non-secret parts of the recovered CFER are stored in the portable part 104' in CF Environment 146' of CF 30'. At step 234, the state vector in CF Environment 146' is updated to indicated that device B is a clone of another device. At step 235, a condition code is returned as an output.

Figure 19:
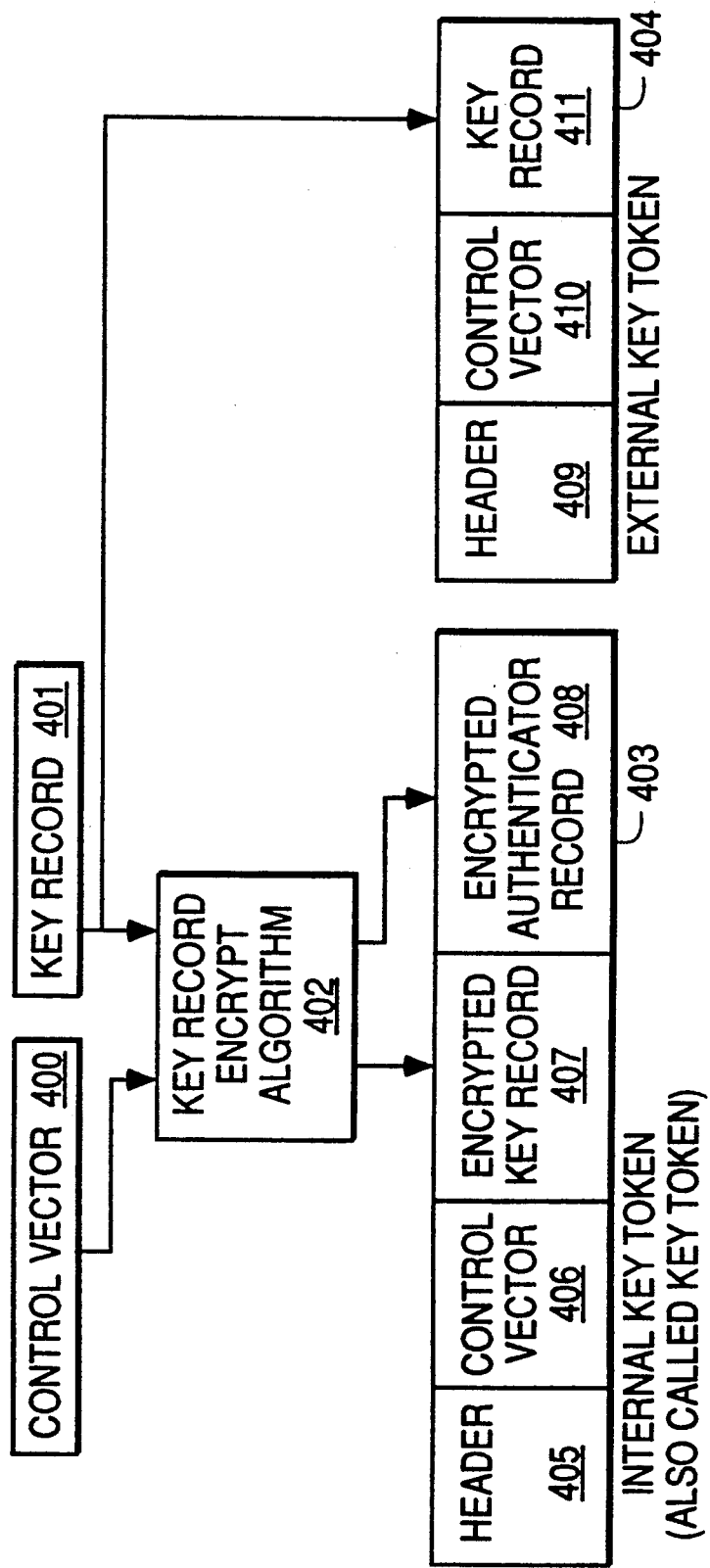
FIG. 19 is a block diagram showing the production of an internal key token from a key record and the production of an external key token from a key record.

Key Tokens and Key Units: Thus far the described invention has taught that a key token is produced within the cryptographic facility (CF) 30 from a control vector and a key record, as shown in FIG. 19, and the so-produced key tokens are stored outside CF 30 in a cryptographic key data set 32. Referring to FIG. 19, a key record 401 and associated control vector 400 are stored either in an internal key token 403 or an external key token 404. That is, a key token is either an internal key token (also referred to as a key token, i.e., without the modifier 'internal') or an external key token. An Internal Key Token 403 consists of a header 405, a control vector 406, and encrypted key record 407, and an encrypted authenticator 408. The encrypted key record 407 and encrypted authenticator record 408 are produced via key record encrypt algorithm 402, using as inputs control vector 400 and key record 401. Control vector 406 in internal key token 403 is just a copy of control vector 400, which is the control vector associated with key record 401. Key record encrypt algorithm 402 is the same key record encrypt algorithm 12 of FIG. 15 in co-pending patent application Ser. No. 07/766,260 ("Public Key Cryptosystem Key Management Based on Control Vectors"), cited in the background art. An External Key Token 404 consists of a header 409, a control vector 410, and a key record 411 (i.e., a clear key record). Control vector 410 in external key token 404 is just a copy of control vector 400, which is the control vector associated with key record 401. A key record is either a public key record (i.e., PU key record) or a private key record (i.e., PR key record). Likewise, an internal key token is either an internal PU key token or an internal PR key token, depending on whether the key token contains a PU key record or a PR key record, respectively, and an external key token is either ar external PU key token or an external PR key token, depending on whether the key token contains a PU key record or a PR key record, respectively.

Figure 20:
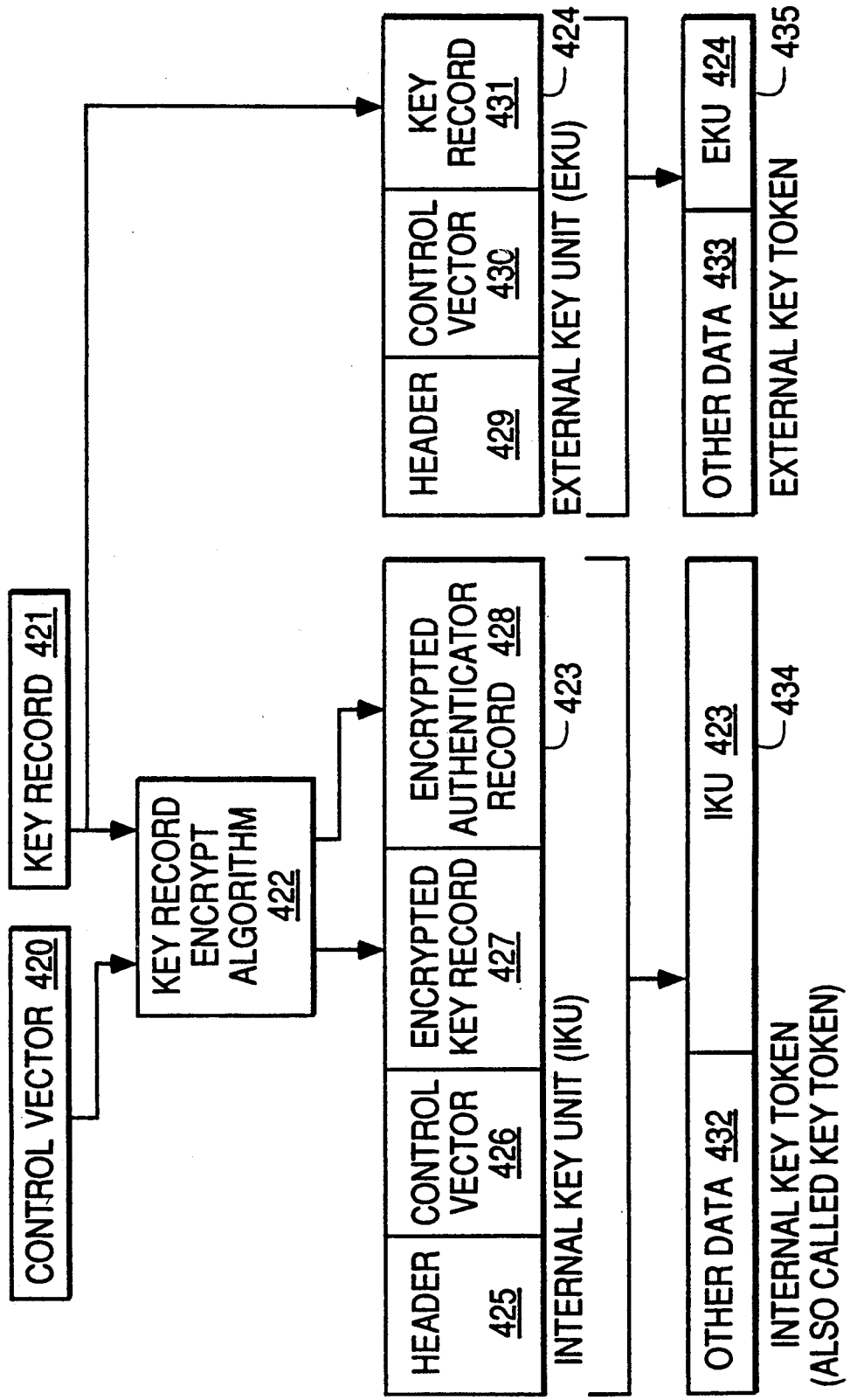
FIG. 20 is a block diagram showing the production of an internal key token from an internal key unit produced from a key record and the production of an external key token from an external key unit produced from a key record.

However, it may be advantageous to permit the cryptographic facility access program (CFAP) 34 to store key-related information in the key token, not directly available to the CF 30 and therefore not convenient or possible for the CF 30 to store in the key token. Thus, it may be more practical for the CFAP 34 to add certain information fields to the key token once the key token is returned to the CFAP 34 as an instruction output. In such situations where the CFAP is permitted to add information to the key token, a new set of terminology is introduced, as illustrated in FIG. 20. Thus, the internal key token 403 in FIG. 19 becomes internal key unit 423 in FIG. 20, and external key token 404 in FIG. 19 becomes external key unit 424 in FIG. 20. Likewise, control vector 400, key record 401, and key record encrypt algorithm 402 of FIG. 19 are just control vector 420, key record 421, and key record encrypt algorithm 422 of FIG. 20. Likewise, header 405, control vector 406, encrypted key record 407 and encrypted authenticator record 408 of FIG. 19 are just header 425, control vector 426, encrypted key record 427, and encrypted authenticator record 428 of FIG. 20. Likewise header 409, control vector 410 and key record 411 of FIG. 19 are just header 429, control vector 430 and key record 431 of FIG. 20. Referring again to FIG. 20, internal key token 434 contains IKU 423 as well as other data 432 supplied by CFAP 34. Likewise, external key token 435 contains EKU 424 as well as other data 433 supplied by CFAP 34. Where convenient, the terminology IKU (i.e., internal key unit) and EKU (i.e., external key unit) will be used instead of internal key token and external key token when it is necessary to refer to quantities produced by CF 30.

Protocol Modes: Consider devices A and B, where A and B agree that B will act as the recovery device for A. The protocol modes that may be specified with the ECFER and ICFER instructions are PBKUP, CBKUP2, and CBKUP1. Basically, each of these modes defines a set of criteria that must be satisfied during PUA key import. Of the three protocol modes, protocol-mode='PBKUP' is the least restrictive. Protocol-mode='CBKUP2' is next in order, and protocol-mode='CBKUP1' is the most restrictive. At the time a PUA key is imported with an IPUK instruction, history information is recorded in the control vector to indicate how and under what conditions the key was imported. Basically, all necessary information is recorded in the control vector and the CF Environment in the CF 30 so that the ECFER and ICFER instructions can later determine whether an imported PUA key meets the requirements for use with a specified protocol-mode. The configuration vector in the CF 30 specifies a minimum threshold protocol mode, which is a value set by the installation or installation security personnel. For protocol-mode='PBKUP', there are essentially no restrictions on how the PUA keys must be imported.

For protocol-mode='CBKUP2', an imported PUA key must be accompanied by a valid digital signature generated on the key token containing the key (PUA) using a private key management key, PRM, belonging to the other device. In this case, the other device is just the same device that provided the PUA key. Moreover, the corresponding PUM key used to validate this signature, when imported, must be accompanied by a valid digital signature generated on the key token containing the key (PUM) using a private certification key, PRC, belonging to a certification center. Moreover, the corresponding PUC key used to validate the signature, when imported, is processed as follows. When the PUC key is imported, either (a) a cryptographic one way hash value is calculated on the key token containing the PUC key and this hash value is stored in the CF Environment, or (b) a cryptographic one way hash value is calculated on the key token containing the PUC key and compared for equality against a similar pre-calculated hash value already loaded and stored in the CF Environment. In the latter case, the PUC key is imported only when the calculated value is equal to the stored value. In either case, later, when an ICFER instruction is executed, the stored hash value corresponding to the PUC key in the CFER is compared for equality against a similar stored hash value in the CF Environment of the receiving device. By ensuring that the two values are equal, the receiving device enforces that the same PUC key is used at the sending and receiving devices. A more detailed discussion of the procedure for comparing the two PUC key hash values is provided below, following the discussion of protocol-mode 'CBKUP1'.

For protocol-mode='CBKUP1', an imported PUA key must be accompanied by a valid digital signature generated on the key token containing the key (PUA) using a private certification key, PRC, belonging to a certification center. Moreover, the corresponding PUC key used to validate the signature, when imported, is processed as follows. When the PUC key is imported, either (a) a cryptographic one way hash value is calculated on the key token containing the PUC key and this hash value is stored in the CF Environment, or (b) a cryptographic one way hash value is calculated on the key token containing the PUC key and compared for equality against a similar pre-calculated hash value loaded and stored in the CF Environment. In the latter case, the PUC key is imported only when the calculated value is equal to the stored value. Pre-loading and storing the hash value has the advantage that different levels of import integrity can be associated with the instruction used for loading the hash values instead of the instruction used for importing keys. Later, when an ICFER instruction is executed, the stored hash value corresponding to the PUC key in the CFER is compared for equality against a similar stored hash value in the CF Environment of the receiving device. By ensuring that the two values are equal, the receiving device enforces that the same PUC key is used at the sending and receiving devices.

The reader will appreciate that the comparison process is easily effected if the cryptographic system has a provision for the storage of only one hash value corresponding to one PUC key. In that case, there is only one storage location for a PUC key hash value within the CFER and only one storage location for a PUC key hash value within the CF Environment of the receiving device. Thus, the ICFER instruction can directly access these two hash values and perform the necessary comparison operation with no difficulty. However, the reader will also appreciate that it is possible for the respective cryptographic systems to implement a provision for handing more than one PUC key. In that case, it is necessary to store a table of PUC key hash values in the CF Environment of the sending and receiving cryptographic devices, and the CFER will therefore contain a table of PUC key hash values. The so-mentioned table of PUC key hash values is referenced in FIG. 10 as Key Import MDCs 163. Furthermore, it is necessary for the ICFER instruction to have a means to address the respective PUC key hash values in the table of PUC key hash values in the CFER and in the CF Environment of the receiving cryptographic device. One means for accomplishing this is to associate an identifier value with each PUC key, say i, which can be used to access the PUC key hash value in the CFER and in the CF Environment of the receiving cryptographic device. For example, the identifier value may be an index value or it may be a domain identifier used to associate the PUC key with a particular domain of cryptographic devices that are assigned to it or that fall within the scope of control or management of a particular assigned certification center. In order that the ICFER instruction will know which domain identifier is to be used to access the PUC key hash values, the domain identifier of the PUC key used to import a PUM key in the case of protocol-mode='CBKUP2' or the domain identifier of the PUC key used to import a PUA key in the case of protocol-mode='CBKUP1' is stored in the control vector of the imported PUA key. Thus, when the PUA key and its accompanying control vector are specified to the ICFER instruction, to be used as part of the XCFER importing process, the domain identifier value stored in the control vector of the PUA key is obtained by the ICFER instruction and used as a means to reference and access a PUC key hash value from a Table of PUC key hash values within the CFER and to reference and access a PUC key hash value from a Table of PUC key hash values within the CF Environment of the receiving device. Thereafter, the comparison operation using these two PUC key hash values proceeds as described above.

The CBKUP1 and CBKUP2 modes contrast as follows. The CBKUP1 mode has the advantage that backup and recovery are controlled via the certification center. That is, no backup and recovery is permitted except as authorized by the certification center. The CBKUP2 mode has the advantage that the parties themselves can effect their own control over the backup and recovery process without requiring signed certificates for PUA keys from the certification center. In situations where the network devices perform key distribution in a certification center environment, each device will already possess a signed certificate containing a PUM key. Hence, the backup and recovery protocol can piggy-back on top of this already existing protocol so that no additional burden or processing requirements are levied on the certification center. Each mode, CBKUP1 and CBKUP2, has its place and use within the key management.

Security of the Backup and Recovery Protocol: The security of the backup and recovery protocol depends to a large extent on something that can be called 'level of trust.' That is, the protection afforded by the backup and recovery protocol depends on where one draws the line between those who are trusted and those who are not trusted.

Suppose that insiders, or installation personnel, are trusted and outsiders are untrusted. For discussion purposes, consider two devices, A and B, where A and B both agree that B will act as the recovery device for A. Let (PUAx,PRAx) be a public and private key pair generated by the adversary. In this case, there are two classic attacks. In a first attack, the outsider adversary intercepts the transmitted PUAb key from B to A and replaces it with PUAx, thus causing PUAx to be incorrectly imported and used with the ECFER instruction. This may compromise the secret part in the XCFER, depending on which embodiment of the invention and mode of operation is practiced. In a second attack, the outsider adversary intercepts the transmitted PUAa key from A to B and replaces it with PUAx, thus causing PUAx to be incorrectly imported and used with the ICFER instruction. This allows the adversary to subvert the authentication checking on the imported CFER, and hence to substitute a CFER of the adversary's choosing. Both the CBKUP1 and CBKUP2 protocol modes permit the PUA key to be electronically distributed with integrity, thus foiling the described attacks. Moreover, as long as PUAa and PUAb can be transported with integrity (e.g., using couriers), the PBKUP protocol mode can be safely used with the ECFER and ICFER instructions. Consider the special case where the cryptographic device to be backed up, i.e., device A, is an unattended device. In that case, the use of couriers to transport PUA keys to or from the device is not practical. Thus, the CBKUP1 and CBKUP2 protocol modes should be considered the only practical alternatives. In this case, the backup and recovery protocol is no better than the method used to register PUA or PUM keys at the certification center for the purpose of receiving a certificate signed with PRC, the private certification key of the certification center and the method for importing and installing PUC at the device. If these key registration and importing mechanisms break down, then the backup and recovery procedure will break down.

Now suppose that the category of insiders is divided into two groups: (a) trusted security personnel and (b) untrusted personnel. That is, security personnel are trusted, but other insiders and all outsiders are untrusted. Again, there are two classic attacks. In a first attack, an insider adversary at A misuses the IPUK instruction to import PUAx and then uses the imported PUAx in an ECFER instruction. This may compromise the secret part in the XCFER, depending on which embodiment of the invention and mode of operation is practiced. In a second attack, an insider adversary at B misuses the IPUK instruction to import PUAx and then uses the imported PUAx in an ICFER instruction. This allows the adversary to subvert the authentication checking on the imported CFER, and hence to substitute a CFER of the adversary's choosing. Both the CBKUP1 and CBKUP2 protocol modes permit the PUA key to be electronically distributed with integrity, thus foiling the described attacks. Moreover, if the IPUK instruction is carefully controlled so that only authorized security personnel are able to import public keys, and if the PUA keys are distributed with integrity (e.g., using couriers), then the PBKUP mode can be safely used with the ECFER and ICFER instructions.

Now suppose that the level of trust is adjusted so that only authorized network personnel (e.g., the certification center personnel) are trusted and all others are not trusted. The attack of concern here is that authorized security personnel will attempt to subvert network-level operating policy by not configuring their cryptographic device CF Environment in conformance with the established network-level specified operating policy. This potential attack is thwarted through a combination of actions performed by the certification center, acting as the authorized network facility for administering network operating policy. This is accomplished by specifying a minimum acceptable CF Environment configuration (e.g., that protocol-mode='CBKUP1' is used in situations where backup and recovery is permitted), requiring each facility to configure its cryptographic device or devices in conformance with this directive, and auditing each device to ensure that it is properly configured before issuing a certificate and digital signature on the certificate using the private key of the certification center.

Figure 21:
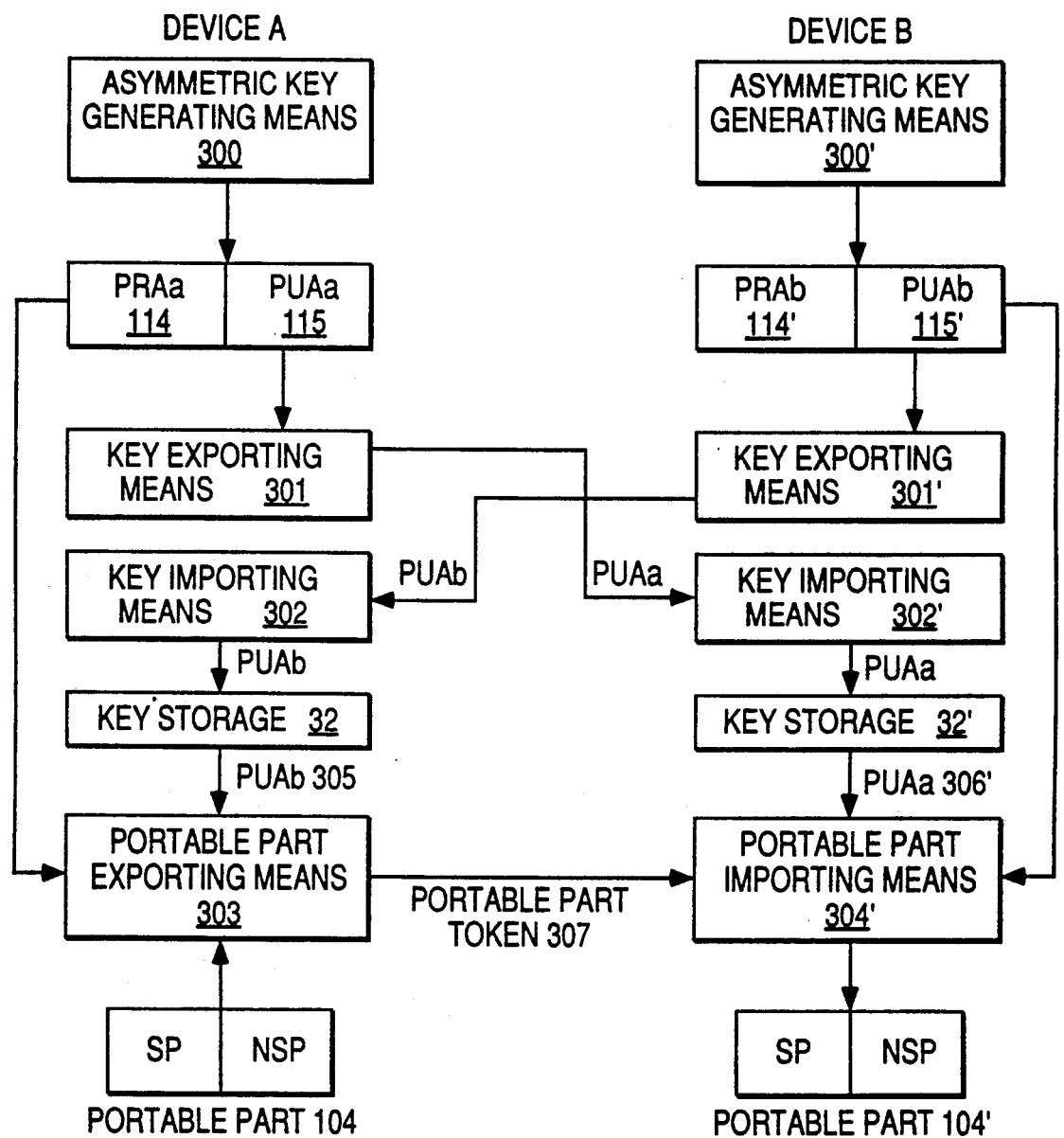
FIG. 21 is a block diagram illustration of the backup and recovery protocol between devices A and B.

FIG. 21 is a block diagram illustration of the backup and recovery protocol between devices A and B. Referring to FIG. 21, device A has an asymmetric key generating means 300 for generating a device authentication key pair, PRAa 114 and PUAa 115, a key exporting means 301 for exporting PUAa keys to device B, a key importing means 302 for importing PUAb keys from device B, a key storage 32 for storing imported PUAb keys, and a portable part exporting means 303 for exporting portable part 104, consisting of a secret part SP and a non-secret part NSP, as a portable part token 307. The inputs to portable part exporting means 303 consist of private key PRAa 114 belonging to device A and public key PUAb 305 received from device B. Likewise, device B has an asymmetric key generating means 300' for generating a device authentication key pair, PRAb 114' and PUAb 115', a key exporting means 301' for exporting PUAb keys to device A, a key importing means 302' for importing PUAa keys from device A, a key storage 32' for storing imported PUAa keys, and a portable part importing means 304' for importing a portable part token 307 received from device A and producing a recovered portable part 104'. For practical purposes, recovered portable part 104' is equal to portable part 104. Those skilled in the art will recognize that the invention is not limited to two particular devices A and B, so that device A can potentially export a portable part token to any other device and device B can potentially import a portable part token from any other device. Moreover, though not specifically shown in FIG. 21, device A may also possess a portable part importing means 304 and device B may also possess a portable part exporting means 303'. Thus devices A and B may be configured to export as well as import portable part tokens.

Figure 22:
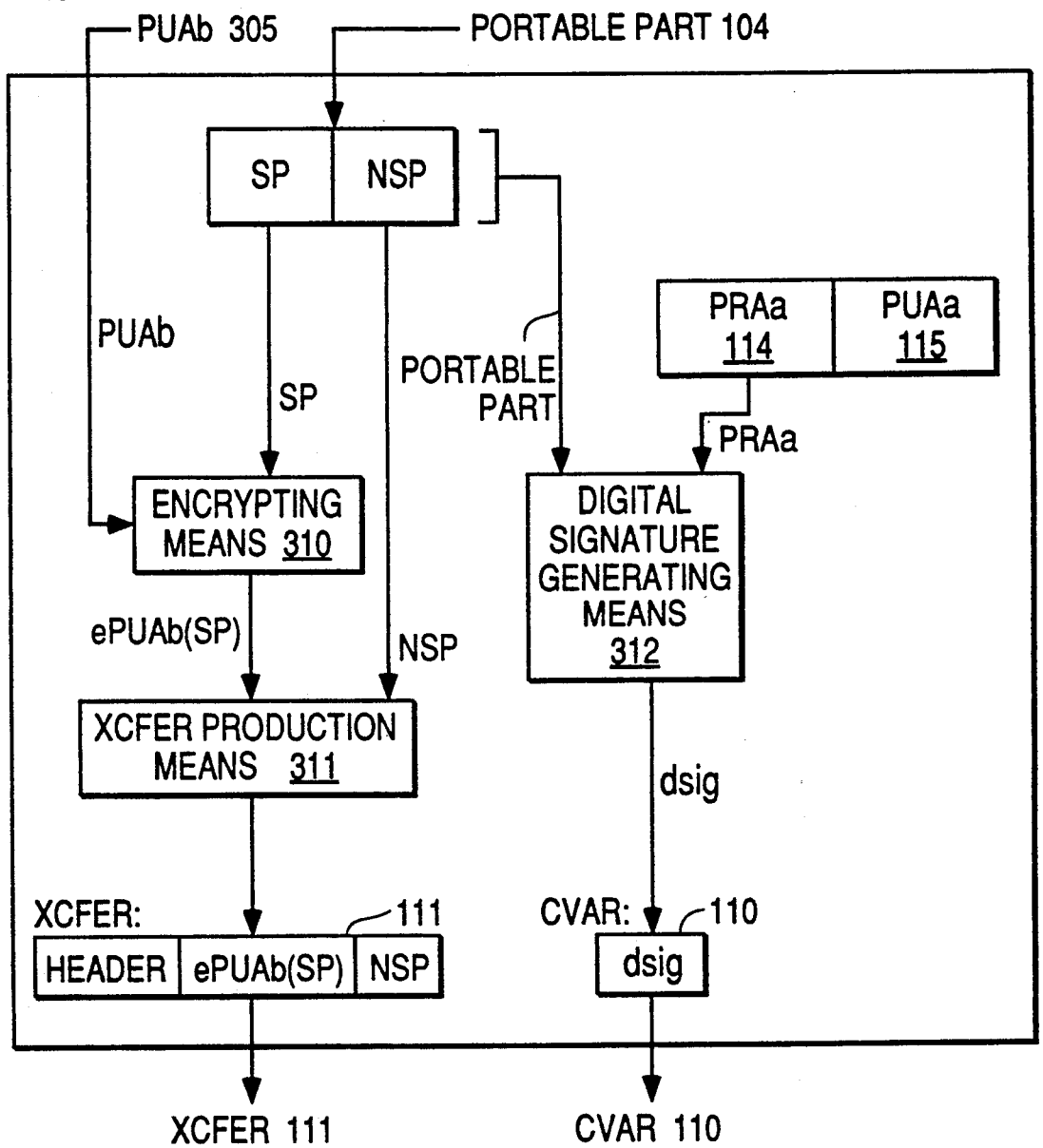
FIG. 22 is a block diagram illustration of a first embodiment of portable part exporting means 303.

FIG. 22 is a block diagram illustration of a first embodiment of portable part exporting means 303. The first embodiment is based entirely on a public key algorithm. Referring to FIG. 22, portable part exporting means 303 has (a) inputs consisting of a public key PUAb 305 received from device B and a portable part 104 to be exported to device B consisting of a secret part SP and a non-secret part NSP, and (b) outputs consisting of an external crypto facility environment record (XCFER) 111 and a cryptovariable (CVAR) 110. The XCFER 111 consists of a header, and encrypted secret part of the form ePUAb(SP), i.e., SP encrypted with PUAb, and NSP. The CVAR 110 consists of a digital signature, dsig. In response to a request to export a portable part, portable part exporting means 303 causes encrypting means 310 to encrypt the secret part SP contained in portable part 104 with public key PUAb 305 to produce ePUAb(SP). The so-produced ePUAb(SP) and the non-secret part NSP contained in portable part 104 are input to XCFER production means 311, which produces XCFER 111 consisting of at least a header, ePUAb(SP) and NSP. Portable part 104 and private key PRAa belonging to device A are input to digital signature generating means 312, which generates a digital signature, dsig, on portable part 104 using PRAa, which is called CVAR 110, since CVAR 110 contains only the so-produced digital signature, dsig.

Figure 23:
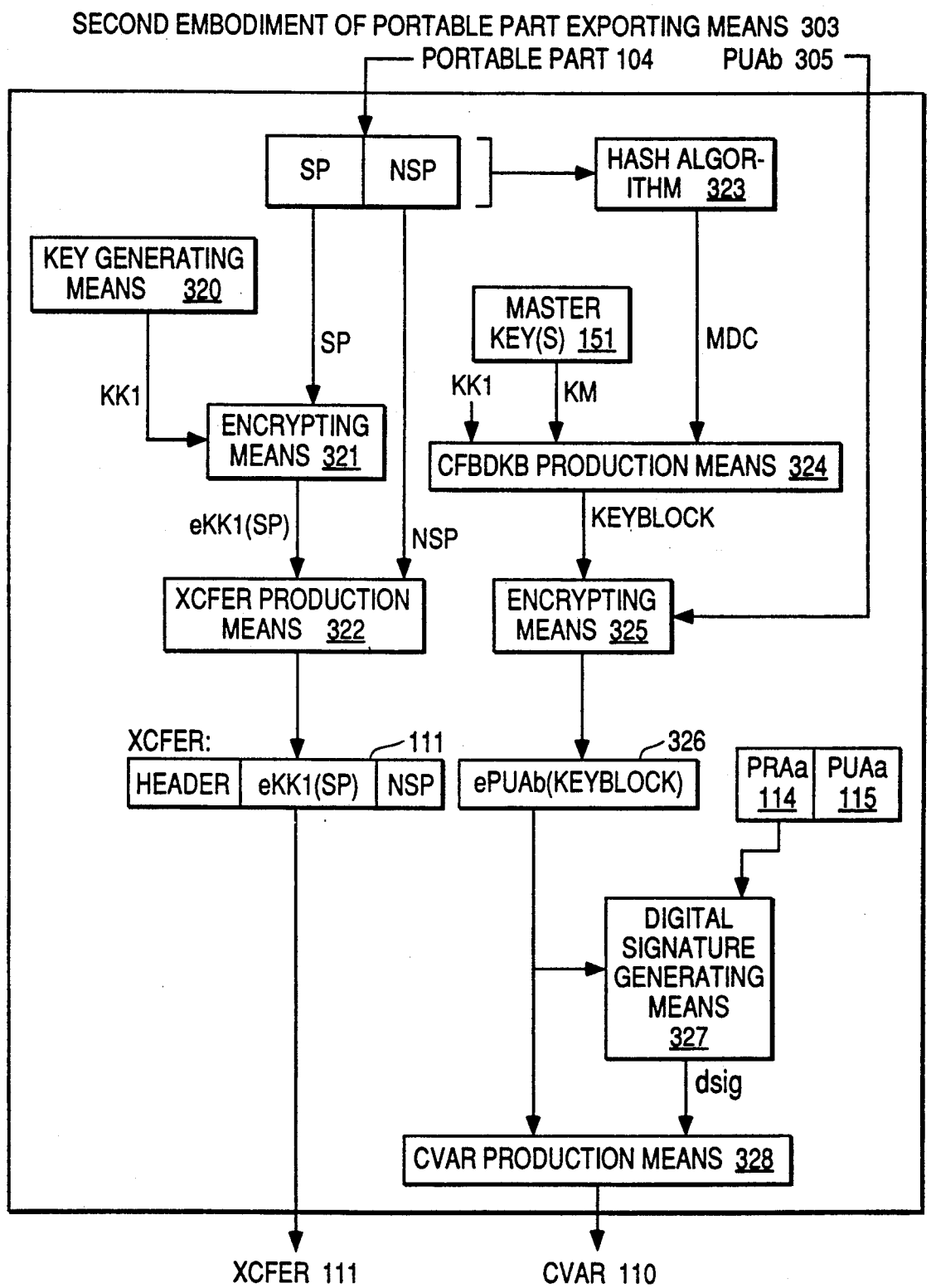
FIG. 23 is a block diagram illustration of a second embodiment of portable part exporting means 303.

FIG. 23 is a block diagram illustration of a second embodiment of portable part exporting means 303. The second embodiment makes use of both a public key algorithm and a symmetric key algorithm such as the Data Encryption Algorithm (DEA). Referring to FIG. 23, portable part exporting means 303 has (a) inputs consisting of a public key PUAb 305 received from device B and a portable part 104 to be exported to device B consisting of a secret part SP and a non-secret part NSP, and (b) outputs consisting of an external crypto facility environment record (XCFER) 111 and a cryptovariable (CVAR) 110. The XCFER 111 consists of a header, and encrypted secret part of the form eKK1(SP), i.e., SP encrypted with KK1, and NSP. The CVAR 110 consists of an encrypted keyblock of the form ePUAb(keyblock), i.e., keyblock encrypted with PUAb, and a digital signature, dsig. In response to a request to export a portable part, portable part exporting means 303 causes key generating means 320 to generate a key KK1, which is supplied as an input to encrypting means 321. Encrypting means 321 encrypts the secret part, SP, contained in portable part 104 to produce eKK1(SP), which is supplied as an input together with the non-secret part, NSP, contained in portable part 104, to XCFER production means 322. XCFER production means 322 produces an XCFER 111 consisting of at least a header, eKK1(SP), and NSP. Portable part 104 is also supplied as an input to hash algorithm 323, which causes a hash value, herein called a modification detection code (MDC), to be calculated on portable part 104 using a strong one-way cryptographic function, also herein described and discussed. The so-produced MDC is supplied as an input to CFBDKB production means 324 together with KK1, master key KM obtained from master key storage 151. CFBDKB production means 324 produces a keyblock containing at least the so-produced MDC and a value KK2 formed as the Exclusive-OR product of KM and KM1. The so-produced keyblock is supplied as an input to encrypting means 325 together with public key PUAb 305, supplied as an input to portable part exporting means 303. Encrypting means 325 encrypts keyblock with PUAb to produce ePUAb(keyblock) 326, which is supplied as an input, together with private key PRAa 114, to digital signature generating means 327. Digital signature generating means 327 generates a digital signature, dsig, on ePUAb(keyblock) 326 using private key PRAa 114. The so-produced ePUAb(keyblock) 326 and the so-produced digital signature, dsig, are supplied as inputs to CVAR production means 328, which produces CVAR 110 containing at least ePUAb(keyblock) and dsig.

Figure 24:
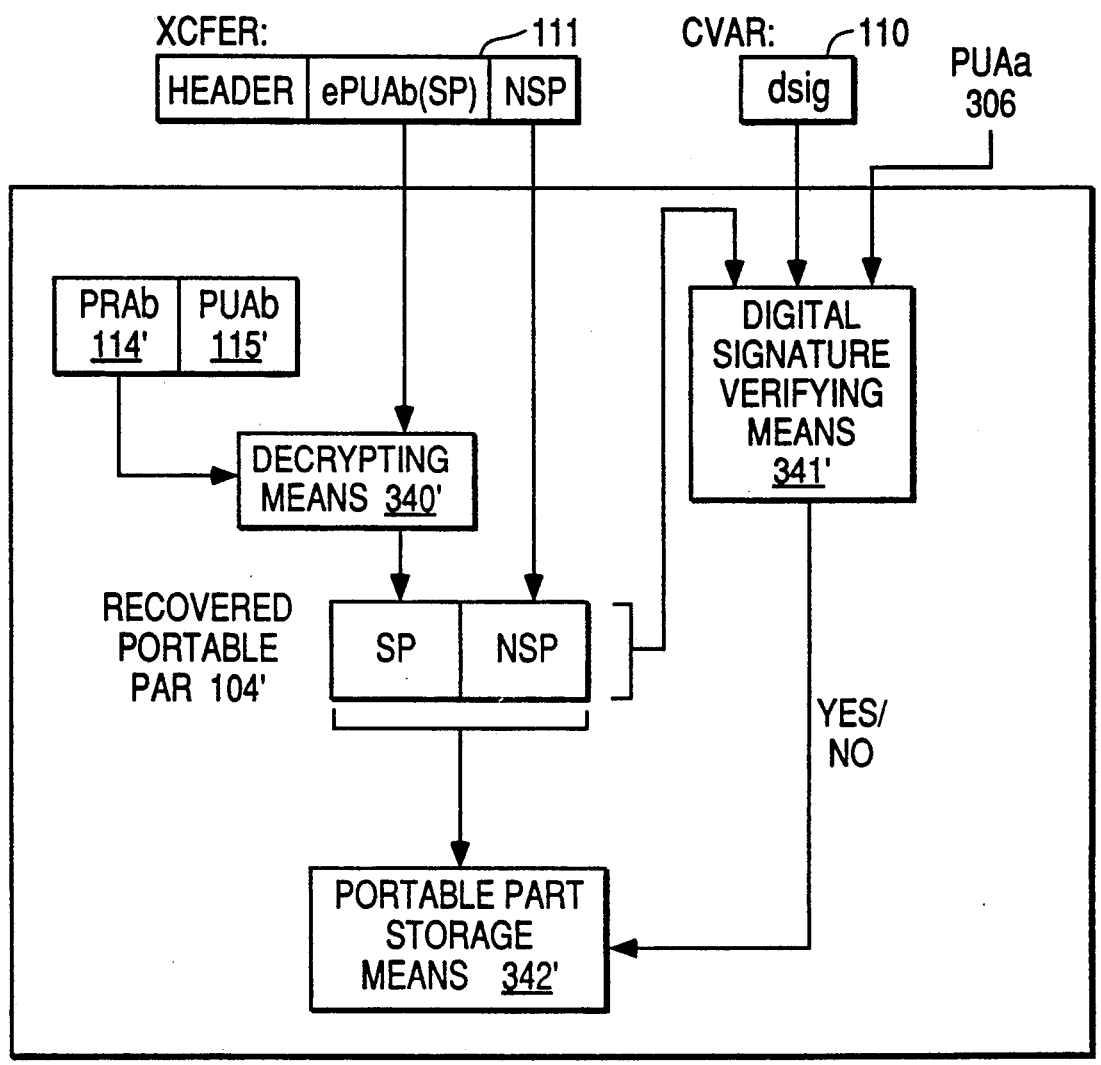
FIG. 24 is a block diagram illustration of a first embodiment of portable part importing means 304'.

FIG. 24 is a block diagram illustration of a first embodiment of portable part importing means 304'. The first embodiment is based entirely on a public key algorithm. Referring to FIG. 24, portable part importing means 304' has inputs consisting of an XCFER 111, a CVAR 110, and a public key PUAa 306 received from device A. There are no outputs, except possibly for a return code indicating the success or failure of the operation, not shown in FIG. 24. The XCFER 111 consists of a header, and encrypted secret part of the form ePUAb(SP), i.e., SP encrypted with PUAb, and NSP.

The CVAR 110 consists of a digital signature, dsig. In response to a request to import a portable part, portable part importing means 304' causes decrypting means 340' to decrypt the encrypted secret part ePUAb(SP) contained in XCFER 111 with private key PRAb 114' belonging to device B to recover SP. The so-produced SP and the non-secret part NSP contained in XCFER 111, which constitute recovered portable part 104', together with the digital signature, dsig, contained in CVAR 110, are supplied as inputs to digital signature verifying means 341'. Digital signature verifying means 341' determines whether the digital signature is valid or not valid, whereupon a "yes" or "no" response indicating valid or not valid, respectively, is produced as an output. The so-produced recovered portable part 104' and the so-produced "yes" or "no" response are supplied as inputs to portable part storage means 342' and, if a positive ("yes") response is received, portable part storage means 342' causes recovered portable part 104' to be stored in device B, thereby causing the current portable part 104' in device B to be replaced by recovered portable part 104'.

Figure 25:
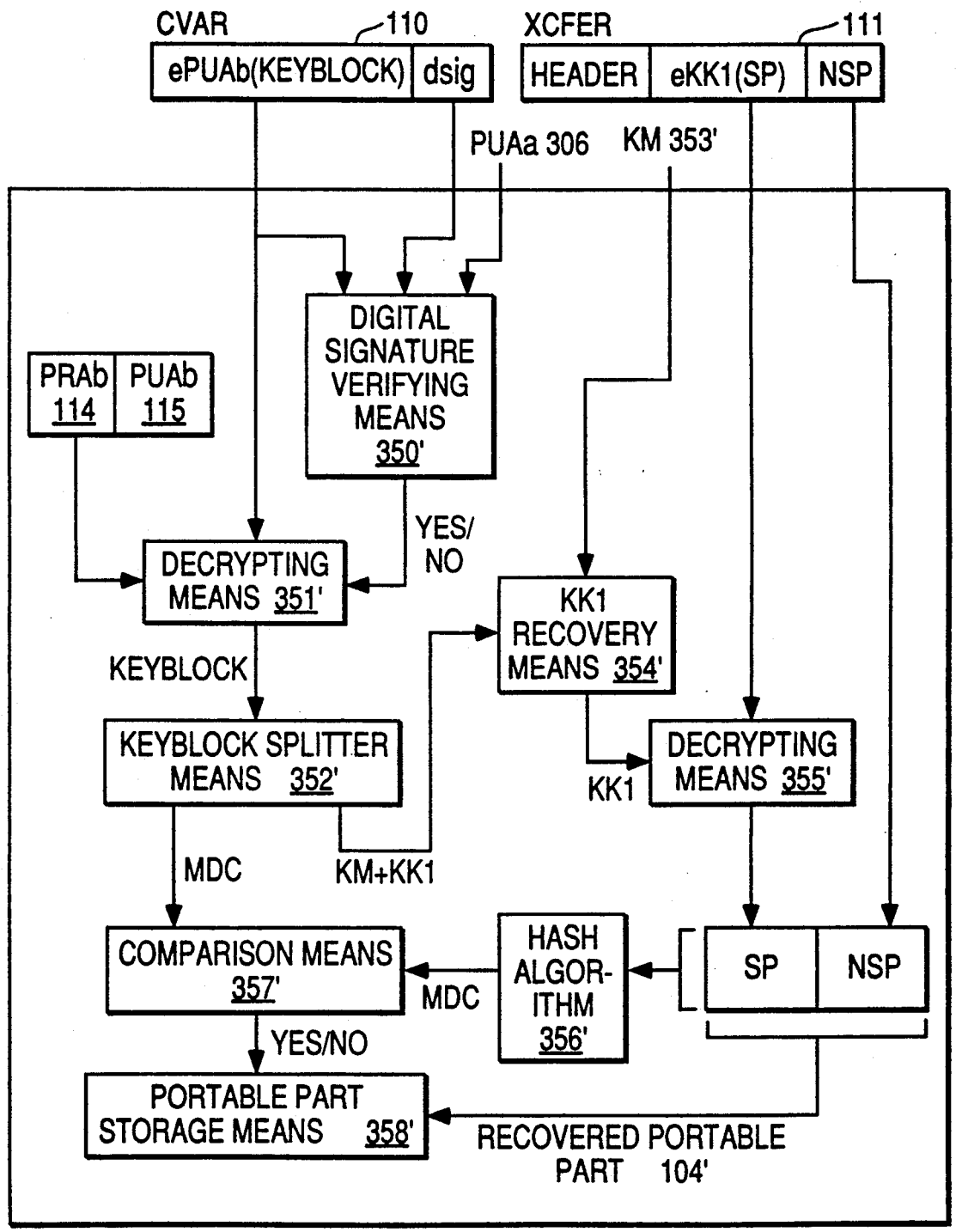
FIG. 25 is a block diagram illustration of a second embodiment of portable part importing means 304'.

FIG. 25 is a block diagram illustration of a second embodiment of portable part importing means 304'. The second embodiment makes use of both a public key algorithm and a symmetric key algorithm such as the Data Encryption Algorithm (DEA). Referring to FIG. 25, portable part importing means 304' has inputs consisting of an XCFER 111, a CVAR 110, a public key PUAa 306 received from device A, and a master key KM. There are no outputs, except possibly for a return code indicating the success or failure of the operation, not shown in FIG. 24. The XCFER 111 consists of a header, and encrypted secret part of the form eKK1(SP), i.e., SP encrypted with KK1, and NSP. The CVAR 110 consists of an encrypted keyblock of the form ePUAb(keyblock), i.e., keyblock encrypted with PUAb, and a digital signature, dsig. In response to a request to import a portable part, ePUAb(keyblock) and dsig contained in CVAR 110, together with PUAa 306, are supplied as inputs to digital signature verifying means 350'. Digital signature verifying means 350' determines whether the digital signature is valid or not valid, whereupon a "yes" or "no" response indicating valid or not valid, respectively, is produced as an output. The so-produced "yes" or "no" response, ePUAb(keyblock) contained in CVAR 110, and private key PRAb 114' belonging to device B are supplied as inputs decrypting means 351'. If a positive ("yes") response is received, decrypting means 351' decrypts ePUAb(keyblock) with PRAb 114' to recover keyblock, and the so-produced keyblock is passed as an input to keyblock splitter means 352'. Keyblock splitter means 352' recovers MDC and KM+KK1 from keyblock and outputs these values. The so-recovered value of KM+KK1 together with KM 353' are passed as inputs to KK1 recovery means 354', which forms the Exclusive-OR product of KM+KK1 and KM to recover KK1. The so-recovered KK1 together eKK1(SP) contained in XCFER 111 are passed as inputs to decrypting means 355', which decrypts eKK1(SP) with KK1 to recover SP. The so-produced SP and the non-secret part NSP contained in XCFER 111, which constitute recovered portable part 104', are passed as inputs to hash algorithm 356', which causes a hash value, herein called a modification detection code (MDC), to be calculated on recovered portable part 104' using a strong one-way cryptographic function, also herein described and discussed. The so-produced MDC and the MDC value recovered and output by keyblock splitter means 352' are passed as inputs to comparison means 357'. If the two MDC values are equal, comparison means 357' outputs a "yes" response, otherwise if the two MDC values are unequal, comparison means 357' outputs a "no" response. The so-produced recovered portable part 104' and the so-produced "yes" or "no" response are supplied as inputs to portable part storage means 358' and, if a positive ("yes") response is received, portable part storage means 358' causes recovered portable part 104' to be stored in device B, thereby causing the current portable part 104' in device B to be replaced by recovered portable part 104'.

Those skilled in the art will recognize in FIG. 23 and FIG. 25 that KK1 could be stored in keyblock instead of the Exclusive-OR product of KM and KK1. In that case, KM would not need to be supplied as an input to CFBDKB production means 324 in FIG. 23. Likewise, KK1 recovery means 354' in FIG. 25 could be omitted and KK1 would be stored in keyblock in place of KM+KK1. In that case, the output KK1 produced by keyblock splitter means 352' would be passed directly to decrypting means 355'. In an alternative embodiment, the user specifies to portable part exporting means 303 whether KM is to be Exclusive ORed with KK1 or not. Likewise, the user specifies to portable part importing means 304' whether a KM is supplied as an input or not, depending on whether a KM must be Exclusive ORed with the key value in the recovered key block or not.

Although a specific embodiment of the invention has been disclosed, it will be understood by those having skill in the art that changes can be made to the specific embodiment without departing from the spirit and the scope of the invention.

What is claimed is:

1. In a data processing system which includes a first cryptographic facility containing configuration information for configuring said first cryptographic facility and coupled to a second cryptographic facility in a public key cryptographic system, a method for duplicating a configuration of said first cryptographic facility, comprising the steps of:
generating a public key and a private key as a pair in said second cryptographic facility;
transferring said public key to said first cryptographic facility;
encrypting at least a portion of said configuration information under said public key forming a configuration token at said first cryptographic facility;
transferring said configuration token to said second cryptographic facility;
decrypting said configuration token using said private key forming a duplicate configuration information at said second cryptographic facility; and
configuring said second cryptographic facility with said duplicate configuration information to duplicate a configuration of said first cryptographic facility.

2. The method of claim 1, which further comprises:
said configuration information including secured information and non-secured information;
said secured information including a master key of said first cryptographic facility;
said encrypting step further comprising encrypting said secured information under said public key;
transferring a cryptographic key data set to said second cryptographic facility, containing an operating key encrypted under a key expression formed as an exclusive OR product of said master key and a control vector for said operating key.

3. The method of claim 1, which further comprises the steps of:
   detecting a failure condition of said first cryptographic facility, prior to said configuring step;
   said configuring step being performed in response to said detecting step.

4. The method of claim 1, which prior to said configuring step, further comprises the steps of:
   generating a second public key and a second private key as a second pair, in said first cryptographic facility;
   transferring said second public key to said second cryptographic facility;
   encrypting a representation of said configuration information under said second private key forming a digital signature at said first cryptographic facility;
   transferring said digital signature to said second cryptographic facility;
   decrypting said digital signature using said second public key forming a reference representation of said configuration information at said second cryptographic facility;
   comparing said reference representation of said configuration information with a representation of said duplicate configuration information at said second cryptographic facility to confirm receipt thereof from said first cryptographic facility; and
   said configuring step being performed in response to said comparing step.

5. The method of claim 4, which further comprises the steps of:
   detecting a failure condition of said first cryptographic facility, prior to said configuring step;
   said configuring step being performed in response to said detecting step and said comparing step.

6. The method of claim 1, wherein said step of transferring said public key further comprises:
   transferring said public key and a control vector to said first cryptographic facility, said control vector specifying limitations on use of said public key to include said step of encrypting at least a portion of said configuration information under said public key forming said configuration token at said first cryptographic facility.

7. In a data processing system which includes a first cryptographic facility containing configuration information for configuring said first cryptographic facility and coupled to a second cryptographic facility in a public key cryptographic system, a method for duplicating a configuration of said first cryptographic facility, comprising the steps of:
   generating a public key and a private key as a pair at said second cryptographic facility;
   transferring said public key to said first cryptographic facility;
   generating a key encrypting key at said first cryptographic facility;
   encrypting at least a portion of said configuration information under said key encrypting key forming a configuration token at said first cryptographic facility;
   transferring said configuration token to said second cryptographic facility;
   encrypting at least said key encrypting key under said public key forming an encrypted key lock at said first cryptographic facility;
   transferring said encrypted key block to said second cryptographic facility as a received encrypted key block;
   decrypting said received encrypted key block using said private key forming a recovered key block including a recovered key encrypting key at said second cryptographic facility;
   decrypting said configuration token using said recovered key encrypting key forming a duplicate configuration information at said second cryptographic facility; and
   configuring said second cryptographic facility with said duplicate configuration information to duplicate a configuration of said first cryptographic facility.

8. The method of claim 7, which further comprises:
   said configuration information including secured information and non-secret information;
   said secured information including a master key of said first cryptographic facility;
   said first said encrypting step further comprising encrypting said secured information under said public key;
   transferring a cryptographic key data set to said second cryptographic facility, containing an operating key encrypted under a key expression formed as an exclusive OR product of said master key and a control vector for said operating key.

9. The method of claim 7, which further comprises the steps of:
   detecting a failure condition of said first cryptographic facility, prior to said configuring step;
   said configuring step being performed in response to said detecting step.

10. The method of claim 7, which prior to said configuring step, further comprises the steps of:
   generating a second public key and a second private key as a second pair, in said first cryptographic facility;
   transferring said second public key to said second cryptographic facility;
   encrypting a representation of said encrypted key block under said second private key forming a digital signature at said first cryptographic facility;
   transferring said digital signature to said second cryptographic facility;
   decrypting said digital signature using said second public key forming a reference representation of said encrypted key block at said second cryptographic facility;
   comparing said reference representation of said encrypted keyblock with a representation of said received encrypted key block at said second cryptographic facility to confirm receipt thereof from said first cryptographic facility; and
   said configuring step being performed in response to said comparing step.

11. The method of claim 7, which prior to said configuring step, further comprises the steps of:
   generating a second public key and a second private key as a second pair, in said first cryptographic facility;
   transferring said second public key to said second cryptographic facility;

encrypting a representation of said key block under said second private key forming a digital signature at said first cryptographic facility;

transferring said digital signature to said second cryptographic facility;

decrypting said digital signature using said second public key forming a reference representation of said key block at said second cryptographic facility;

comparing said reference representation of said key block with a representation of said recovered key block at said second cryptographic facility to confirm receipt thereof from said first cryptographic facility; and said configuring step being performed in response to said comparing step.

12. The method of claim 11, which further comprises the steps of:

detecting a failure condition of said first cryptographic facility, prior to said configuring step;

said configuring step being performed in response to said detecting step and said comparing step.

13. The method of claim 7, wherein said step of transferring said public key further comprises:

transferring said public key and a control vector to said first cryptographic facility, said control vector specifying limitations on use of said public key to include said step of encrypting at least said key encrypting key under said public key forming said encrypted key block at said first cryptographic facility.

14. The method of claim 7, wherein said encrypted key block is formed comprising the steps of:

computing a hash value of a representation of said configuration information at said first cryptographic facility;

concatenating said hash value with said key encrypting key, forming an argument value at said first cryptographic facility; and encrypting at least said argument value under said public key forming said encrypted key block at said first cryptographic facility;

and wherein said configuring step is performed in response to the steps comprising:

separating said hash value from said key encrypting key in said recovered key block, as a received hash value, at said second cryptographic facility;

computing a reference hash value of a representation of said duplicate configuration information, at said second cryptographic facility;

comparing said reference hash value with said received hash value, at said second cryptographic facility;

said configuring step being performed in response to said comparing step.

15. The method of claim 7, wherein said encrypted key block is formed comprising the steps of:

accessing a master key value at said first cryptographic facility;

computing a hash value of a representation of said configuration information at said first cryptographic facility;

logically combining said master key with said key encrypting key forming a product value, using an invertible logical operation;

concatenating said product value and said hash value forming an argument value at said first cryptographic facility; and encrypting at least said argument value under said public key forming said encrypted key block at said first cryptographic facility;

and wherein said recovered key encrypting key is formed, comprising the steps of:

separating said product value from said recovered key block at said second cryptographic facility;

transferring said master key to said second cryptographic facility; and logically combining said master key with said product at said second cryptographic facility, forming said recovered key encrypting key, using an inverse of said logical operation.

16. A computer program in a data processing system which includes a first cryptographic facility containing configuration information for configuring said first cryptographic facility and coupled to a second cryptographic facility in a public key cryptographic system, the computer program when executed in said data processing system, performing a method for duplicating a configuration of said first cryptographic facility, comprising the steps of:

generating a public key and a private key as a pair in said second cryptographic facility;

transferring said public key to said first cryptographic facility;

encrypting at least a portion of said configuration information under said public key forming a configuration token at said first cryptographic facility;

transferring said configuration token to said second cryptographic facility;

decrypting said configuration token using said private key forming a duplicate configuration information at said second cryptographic facility; and configuring said second cryptographic facility with said duplicate configuration information to duplicate a configuration of said first cryptographic facility.

17. The computer program of claim 16, which further comprises:

said configuration information including secured information and non-secret information;

said secured information including a master key of said first cryptographic facility;

said encrypting step further comprising encrypting said secured information under said public key; said method performed by the computer program transferring a cryptographic key data set to said second cryptographic facility, containing an operating key encrypted under a key expression formed as an exclusive OR product of said master key and a control vector for said operating key.

18. The computer program of claim 16, wherein said method performed thereby further comprises the steps of:

detecting a failure condition of said first cryptographic facility, prior to said configuring step;

said configuring step being performed in response to said detecting step.

19. A computer program in a data processing system which includes a first cryptographic facility containing configuration information for configuring said first cryptographic facility and coupled to a second cryptographic facility in a public key cryptographic system, the computer program when executed in said data processing system, performing a method for duplicating a configuration of said first cryptographic facility, comprising the steps of:

generating a public key and a private key as a pair of said second cryptographic facility;

transferring said public key to said first cryptographic facility;

generating a key encrypting key at said first cryptographic facility;

encrypting at least a portion of said configuration information under said key encrypting key forming a configuration token at said first cryptographic facility;

transferring said configuration token to said second cryptographic facility;

encrypting at least said key encrypting key under said public key forming an encrypted key block at said first cryptographic facility;

transferring said encrypted key block to said second cryptographic facility as a received encrypted key block;

decrypting said received encrypted key block using said private key forming a recovered key block including a recovered key encrypting key at said second cryptographic facility;

decrypting said configuration token using said recovered key encrypting key forming a duplicate configuration information at said second cryptographic facility; and configuring said second cryptographic facility with said duplicate configuration information to duplicate a configuration of said first cryptographic facility.

20. The computer program of claim 19, which further comprises:

said configuration information including secured information and non-secured information;

said secured information including a master key of said first cryptographic facility;

said first said encrypting step further comprising encrypting said secured information under said public key;

said method performed by the computer program transferring a cryptographic key data set to said second cryptographic facility, containing an operating key encrypted under a key expression formed as an exclusive OR product of said master key and a control vector for said operating key.

21. In a data processing system which includes a first cryptographic facility containing configuration information for configuring said first cryptographic facility and coupled to a second cryptographic facility in a public key cryptographic system, a computer apparatus for duplicating a configuration of said first cryptographic facility, comprising:

generating means for generating a public key and a private key as a pair in said second cryptographic facility;

first transferring means coupled to said generating means, for transferring said public key to said first cryptographic facility;

encrypting means coupled to said first transferring means, for encrypting at least a portion of said configuration information under said public key forming a configuration token at said first cryptographic facility;

second transferring means coupled to said encrypting means, for transferring said configuration token to said second cryptographic facility;

decrypting means coupled to said second transferring means, for decrypting said configuration token using said private key forming a duplicate configuration information at said second cryptographic facility; and configuring means coupled to said decrypting means, for configuring said second cryptographic facility with said duplicate configuration information to duplicate a configuration of said first cryptographic facility.

22. The computer apparatus of claim 21, which further comprises:

said configuration information including secured information and non-secured information;

said secured information including a master key of said first cryptographic facility;

said encrypting means encrypting said secured information under said public key;

third transferring means coupled to a storage means in said data processing system, for transferring a cryptographic key data set to said second cryptographic facility, containing an operating key encrypted under a key expression formed as an exclusive OR product of said master key and a control vector for said operating key.

23. The computer apparatus of claim 21, which further comprises:

detecting means coupled to said first and said second cryptographic facility, for detecting a failure condition of said first cryptographic facility;

said configuring means operating in response to said detecting means.

24. In a data processing system which includes a first cryptographic facility containing configuration information for configuring said first cryptographic facility and coupled to a second cryptographic facility in a public key cryptographic system, a computer apparatus for duplicating a configuration of said first cryptographic facility, comprising:

first generating means for generating a public key and a private key as a pair at said second cryptographic facility;

first transferring means coupled to said first generating means, for transferring said public key to said first cryptographic facility;

second generating means for generating a key encrypting key at said first cryptographic facility;

first encrypting means coupled to said second generating means, for encrypting at least a portion of said configuration information under said key encrypting key forming a configuration token at said first cryptographic facility;

second transferring means coupled to said first encrypting means, transferring said configuration token to said second cryptographic facility;

second encrypting means coupled to said first transferring means and said second generating means, for encrypting at least said key encrypting key under said public key forming an encrypted key block at said first cryptographic facility;

third transferring means coupled to said second encrypting means, transferring said encrypted key block to said second cryptographic facility as a received encrypted key block;

first decrypting means coupled to said third transferring means, for decrypting said received encrypted key block using said private key forming a recovered key block including a recovered key encrypting key at said second cryptographic facility;

second decrypting means coupled to said second transferring means, decrypting said configuration token using said recovered key encrypting key forming a duplicate configuration information at said second cryptographic facility; and configuring means coupled to said decrypting means, for configuring said second cryptographic facility with said duplicate configuration information to duplicate a configuration of said first cryptographic facility.

25. The computer apparatus of claim 24, which further comprises:

said configuration information including secured information and non-secured information;

said secured information including a master key of said first cryptographic facility;

said first encrypting means encrypting said secured information under said public key;

fourth transferring means coupled to a storage means in said data processing system, for transferring a cryptographic key data set to said second cryptographic facility, containing an operating key encrypted under a key expression formed as an exclusive OR product of said master key and a control vector for said operating key.

26. The computer apparatus of claim 24, which further comprises:

detecting means coupled to said first, and said second cryptographic facility, for detecting a failure condition of said first cryptographic facility;

said configuring means operating in response to said detecting means.

* * * * *